(12) United States Patent
Heckmeier et al.

(10) Patent No.: US 7,701,628 B2
(45) Date of Patent: Apr. 20, 2010

(54) ELECTRO-OPTIC LIGHT CONTROL ELEMENT, DISPLAY AND MEDIUM

(75) Inventors: Michael Heckmeier, Bensheim (DE); Achim Götz, Alsbach-Hähnlein (DE)

(73) Assignee: Merck Patent GmbH, Darmstadt (DE)

( * ) Notice: Subject to any disclaimer, the term of this patent is extended or adjusted under 35 U.S.C. 154(b) by 1500 days.

(21) Appl. No.: 10/477,609

(22) PCT Filed: Apr. 18, 2002

(86) PCT No.: PCT/EP02/04300

§ 371 (c)(1),
(2), (4) Date: Nov. 14, 2003

(87) PCT Pub. No.: WO02/093244

PCT Pub. Date: Nov. 21, 2002

(65) Prior Publication Data

US 2004/0150633 A1    Aug. 5, 2004

(30) Foreign Application Priority Data

May 16, 2001 (DE) ................................ 101 24 040

(51) Int. Cl.
*G02F 1/00* (2006.01)
*G02F 1/1335* (2006.01)
*C09K 19/02* (2006.01)

(52) U.S. Cl. ...................... 359/245; 359/231; 359/246; 349/117; 349/168; 349/182; 349/186

(58) Field of Classification Search .................. 428/1.1, 428/1.3; 349/117, 118, 119, 168, 182, 186; 359/231, 245, 246; 252/299.01
See application file for complete search history.

(56) References Cited

U.S. PATENT DOCUMENTS

| 3,795,436 | A |   | 3/1974 | Boller et al. |
| 5,993,691 | A | * | 11/1999 | Pausch et al. ........ 252/299.63 |
| 6,146,720 | A | * | 11/2000 | Pausch et al. ............... 428/1.1 |
| 6,521,303 | B2 | * | 2/2003 | Heckmeier et al. ........... 428/1.1 |
| 6,582,782 | B2 | * | 6/2003 | Heckmeier et al. ........... 428/1.1 |
| 6,602,562 | B2 | * | 8/2003 | Nakajima et al. ............ 428/1.1 |
| 7,327,432 | B2 | * | 2/2008 | Skjonnemand ............. 349/168 |
| 7,440,160 | B2 | * | 10/2008 | Heckmeier et al. .......... 359/322 |
| 2002/0150698 | A1 | * | 10/2002 | Kawabata ................... 428/1.1 |
| 2006/0006363 | A1 | * | 1/2006 | Heckmeier et al. ..... 252/299.01 |
| 2006/0071878 | A1 | * | 4/2006 | Heckmeier et al. ........... 345/30 |

FOREIGN PATENT DOCUMENTS

| DE | 100 18 598 |   | 11/2000 |
| DE | 10018598 | * | 11/2000 |
| WO | 92/16519 |   | 10/1992 |

OTHER PUBLICATIONS

Patent Abstracts of Japan, vol. 1999, No. 12 (Oct. 29, 1999).
J. C. Filippini, et al, "Nematogenic Liquids: A New Class of Materials for Kerr Cells", *Journal of Physics D*, vol. 8, No. 12 (Aug. 21, 1975).

* cited by examiner

*Primary Examiner*—Shean C Wu
(74) *Attorney, Agent, or Firm*—Millen, White, Zelano & Branigan, P.C.

(57) ABSTRACT

The invention relates to an electro-optic light control element, electro-optic displays containing said elements and display systems such as TV screens and computer monitors. The inventive light control elements contain a mesogenic control medium which is present in the isotropic phase during operation of the light control elements and arc characterized both by good contrast and low angular field dependence and particularly by very short switching, times. The invention also relates to the mesogenic control media used in the electro-optic light control elements.

30 Claims, 3 Drawing Sheets

ELECTRO-OPTIC LIGHT CONTROL ELEMENT, DISPLAY AND MEDIUM

FIELD OF THE INVENTION

The present invention relates to light modulation elements and to displays containing same. The light modulation elements preferably use modulation media which have anisotropic properties at certain temperatures, such as, for example, liquid crystals. The light modulation elements are operated at a temperature at which the modulation media are in the isotropic phase.

The present invention relates to an electro-optical light modulation element and to electro-optical displays and display systems containing elements of this type, such as, for example, television screens and computer monitors. The light modulation elements according to the invention contain a mesogenic modulation medium which is in the isotropic phase during operation of the light modulation elements and are particularly distinguished by very short response times in addition to good contrast and low viewing-angle dependence.

The present invention furthermore relates to media and to the use thereof as modulation media in light modulation elements of this type.

OBJECT AND PRIOR ART

Conventional electro-optical liquid-crystal displays are known in general terms. They are operated at a temperature at which the modulation medium is in a mesophase, in most display types in the nematic phase. In the mesophase, the modulation media already have anisotropic properties, such as, for example, birefringence (Δn). This is not induced only when an electric field is applied. The most widespread are TN ("twisted nematic") and STN ("super twisted nematic") displays. The liquid-crystal cells in these displays have electrodes on the substrates on the two opposite sides of the liquid-crystal medium. The electric field is thus essentially perpendicular to the liquid-crystal layer. The first-mentioned displays in particular are used in combination with TFT (thin film transistor) addressing for displays having a large information content and high resolution, for example in laptop and notebook computers. Use has recently increasingly been made, in particular in desktop computer monitors, of liquid-crystal displays of the IPS (in-plane switching, for example DE 40 00 451 and EP 0 588 568) type or alternatively of the VAN (vertically aligned nematic) type. VAN displays are a variant of the ECB (electrically controlled birefringence) displays. In a modern variant of the MVA (multidomain vertically aligned) displays, a plurality of domains are stabilised per addressed electrode, and in addition a special optical compensation layer is used. These displays, like the TN displays already mentioned, use an electric field perpendicular to the liquid-crystal layer. In contrast thereto, IPS displays generally use electrodes on only one substrate, i.e. on one side of the liquid-crystal layer, i.e. are characterised by a significant component of the electric field parallel to the liquid-crystal layer.

A common feature of all these conventional displays is relatively slow switching, which is, in particular, inadequate for the ever more widespread TV and multimedia applications. This is particularly striking in comparison with the virtually ubiquitous cathode-ray tubes. A further disadvantage of the known electro-optical effects employed in liquid-crystal displays is the significant viewing-angle dependence of the contrast achieved. In most cases, this is so great that compensation layers, typically anisotropic films, in some cases with a complex structure, have to be used for displays operated with direct viewing.

The present invention had the object of developing light modulation elements having good viewing-angle dependence and the lowest possible addressing voltages which switch particularly quickly. These light modulation elements should have the lowest possible layer thickness of the modulation media in order to be able to be employed as elements in FPDs (flat panel displays), such as, for example, flat panel screens for computers. They should furthermore be addressable by means of a simple electrode configuration and have a relatively low operating voltage. In addition, they should have good contrast with low viewing-angle dependence for use in electro-optical displays.

Fast-switching electro-optical light modulation elements proposed in U.S. Pat. No. 3,795,436 and U.S. Pat. No. 3,796,479 are Kerr cells containing mesogenic, in particular nematogenic media. These cells are operated at a temperature above the clearing point of the mesogenic media. However, their large layer thicknesses, which are in the region of a few millimeters or even a few centimeters, and in particular their high operating voltages in the region of 1 kV mean that these light modulation elements are of low suitability for electro-optical displays and are unsuitable for flat-panel screens. In addition, their structure makes it very difficult to achieve pixel structures. This applies in particular to displays having low viewing-angle dependence of the contrast.

The electro-optical Kerr effect is occasionally mentioned as an application of mesogenic media, such as liquid crystals, inter alia in WO 92/16500 and WO 92/16519. However, the use of light modulation elements of this type in electro-optical displays is not described therein.

There is thus a demand for improved light modulation elements, in particular for use in displays having short response times, as are necessary, for example, in multimedia applications.

PRESENT INVENTION

Surprisingly, it has been found that light modulation elements which
    contain a mesogenic medium,
    have an electrode arrangement which is able to generate an electric field having a significant component parallel to the surface of the mesogenic medium,
    are operated at a temperature at which the mesogenic medium is in the isotropic phase, and
    have at least one element for polarisation of the light
enable the production of excellent displays.

In particular, the contrast of these displays and its viewing-angle dependence are excellent. The response times are extremely short, and the addressing voltages are only moderately high.

The electric field used is preferably an inhomogeneous field.

The maximum contrast ratio of 36.8 was observed on perpendicular observation (an observation angle $\Phi=\Theta=0°$). The minimum contrast ratio down to an observation angle of $\Theta=60°$ was 6.1.

Figure 2:
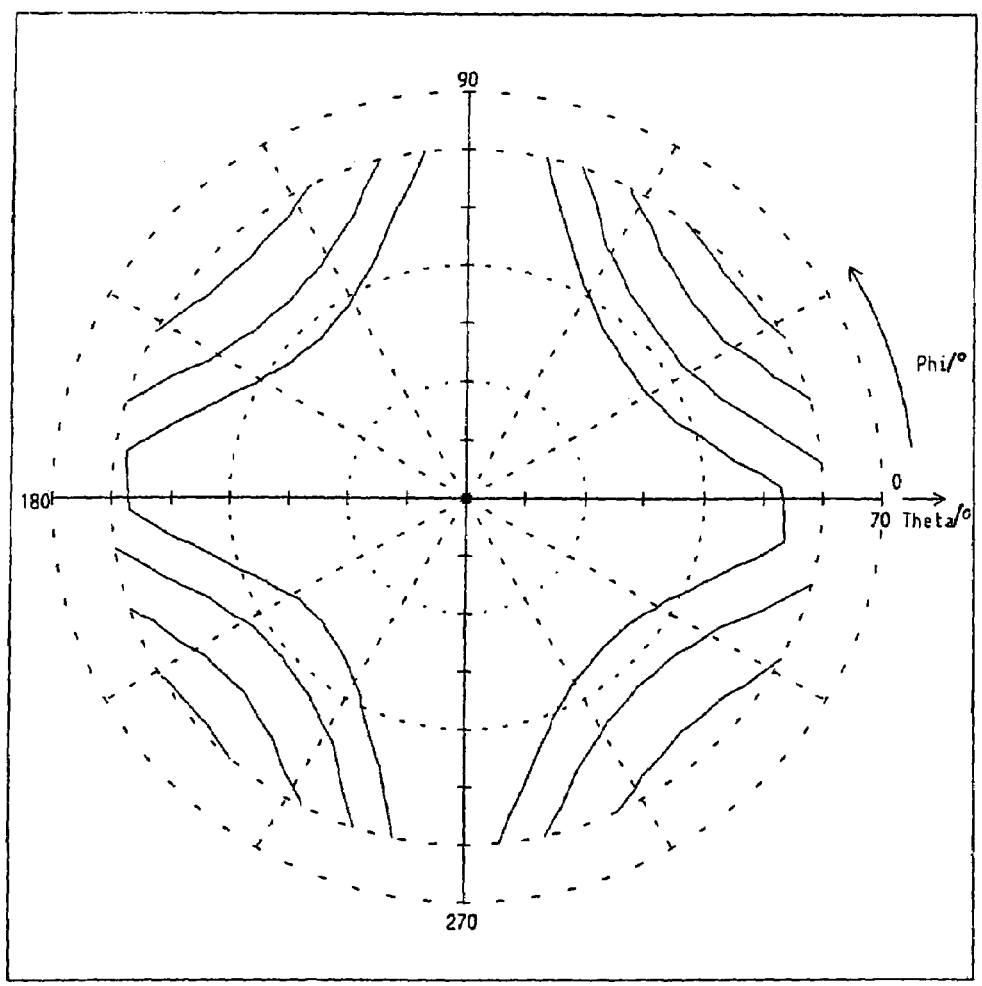
FIG. 2: The figure shows the contrast ratios of the light modulation element of Example 4 according to the invention. The measurement conditions, in particular the operating voltages, are described in the text. The plot is in polar coordinates. The lines show, from the inside outward, the contrast ratios of 30, 20, 15 and 10.
Figure 3:
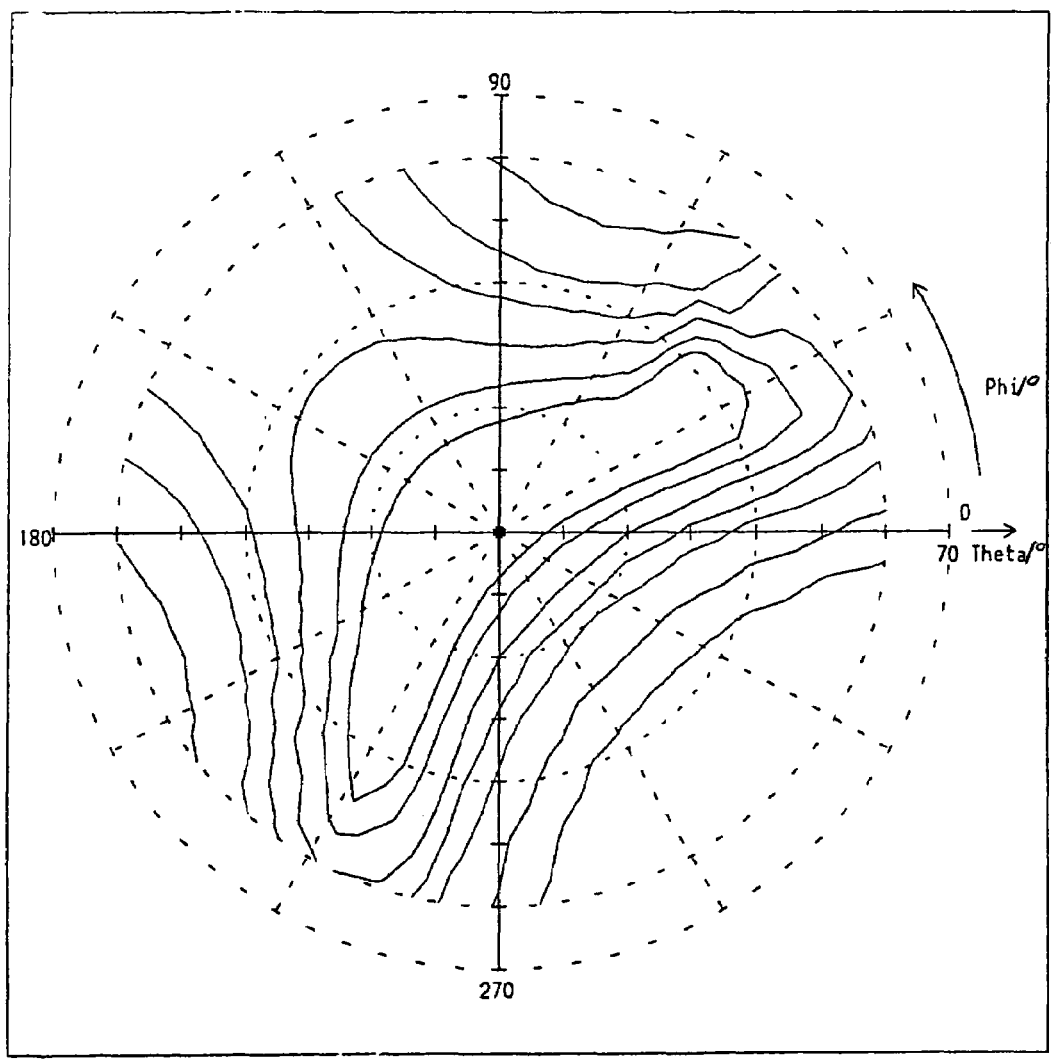

FIG. 3: The figure shows the contrast ratios of the light modulation element of the comparative example. The measurement conditions, in particular the operating voltages, are described in the text. The plot is, as in FIG. 2, in polar coordinates. The lines show, from the inside outward, the contrast ratios of 20, 15, 10, 7, 5, 3 and 2. The maximum contrast was 29.9 and the minimum contrast 1.0.

DETAILED DESCRIPTION OF THE INVENTION

The mesogenic medium is used as modulation medium of the light modulation element. In the present application, the term mesogenic media is applied to media which have a mesophase, are soluble in a mesophase or induce a mesophase. The mesophase is a smectic or, preferably, a nematic phase.

The medium used for investigating the mesogenic properties of media which do not have a mesophase is preferably the nematic mixture ZLI-4792 from Merck KGaA, Darmstadt, Germany. The mesogenic media preferably have a clearing point, extrapolated from 10% solution in this mixture, of −100° C. or above, particularly preferably of −50° C. or above and very particularly preferably of −20° C. or above.

The light modulation elements according to the invention preferably contain a mesogenic medium which is in the isotropic phase at the operating temperature. This medium is advantageously located on or below one substrate.

In general, the mesogenic medium is located between two substrates. If the mesogenic medium is located between two substrates, at least one of these substrates is light-transparent. The light-transparent substrate or the light-transparent substrates may, for example, consist of glass, quartz or plastic. If a non-light-transparent substrate is used, this may consist, inter alia, of a metal or a semiconductor. These media can be used as such or can be located on a support, for example a ceramic. If the mesogenic medium is a polymeric medium, the use of a second substrate can, if desired, be omitted. Polymeric mesogenic media can even be produced in self-supporting form. In this case, no substrate at all is necessary.

The light modulation elements according to the invention have an electrode structure which generates an electric field having a significant component parallel to the layer of the mesogenic medium. This electrode structure may be designed in the form of interdigital electrodes. It may be designed in the form of combs or ladders. Designs in the form of superimposed "H"s and double "T"s or "I"s are also advantageous. The electrode structure is advantageously only located on one side of the mesogenic medium, on use of at least one substrate preferably between the latter and the mesogenic medium. The electrode structure is preferably located in at least two different planes which are both on one side of the mesogenic modulation medium, in particular if the electrode structure contains overlapping sub-structures. These sub-structures are advantageously separated from one another by a dielectric layer. If the sub-structures are located on the opposite sides of an insulation layer, it is possible to select a layout which allows the production of capacitors. This is particularly advantageous in the case of addressing of displays by means of an active matrix. Active matrix displays of this type use a matrix of addressing elements assigned to the individual light modulation elements, with a non-linear current-voltage characteristic line, such as, for example, TFTs or MIM (metal insulator metal) diodes.

The electrodes may consist of transparent material, such as, for example, indium tin oxide (ITO). In this case, it may be advantageous and in some cases necessary to cover part or parts of the light modulation element by means of a black mask. This allows areas in which the electric field is not effective to be screened off and the contrast thus improved. However, the electrodes may also consist of opaque material, usually metal. In this case, the use of a separate black mask may, if desired, be omitted.

In another embodiment, the sub-structures of the electrode structure are located on the two opposite sides of the mesogenic medium. In this case, the corresponding parts of the electrodes are not perpendicular to one another, but instead are laterally offset with respect to one another in such a way that a component of the electric field parallel to the layer of the mesogenic medium arises.

In a further embodiment, the electrode structures are raised, i.e. have a certain thickness which is not negligible compared with the layer thickness of the mesogenic medium. In this case, the electrode structure may have different topographies. The electrode structure may extend through a significant proportion of the total thickness of the layer of the mesogenic modulation medium. However, the maximum height of the electrode layer or electrode layers is preferably significantly smaller than the thickness of the mesogenic medium. The ratio is preferably 1:3 or less, particularly preferably 1:10 or less and very particularly 1:50 or less. In some cases, the thickness of the electrode layer may be negligible compared with the thickness of the mesogenic medium, in which case the ratio is preferably 1:100 or less.

The operating temperature of the light modulation element is preferably above the transition temperature of the modulation medium into the isotropic phase, in general in the range from 0.1° to 50° above this transition temperature, preferably in the range from 0.5 to 10° above this transition temperature and particularly preferably in the range from 0.1° to 5° above this transition temperature.

On application of a voltage, an alignment which results in optical retardation, which can be visualised in a known manner, is induced in the mesogenic medium in the isotropic phase. An inhomogeneous electric field is preferably used.

The light modulation elements according to the invention contain at least one element for polarisation of the light. In addition, they preferably contain a further optical element. This further optical element is either a second element for polarisation of the light, a reflector or a transflector.

The optical elements are arranged in such a way that the light, on passing through the mesogenic medium of the light modulation element, passes at least once through at least one polarising element both before entering the mesogenic medium and after exiting from the mesogenic medium.

In a preferred embodiment of the light modulation element in accordance with the present invention, the mesogenic medium is located between two polarisers, i.e. a polariser and an analyser. Two linear polarisers are preferably used. In this embodiment, the absorption axes of the polarisers are preferably crossed and preferably form an angle of 90°.

The light modulation element according to the invention optionally contains one or more birefringent layers. It preferably contains one λ/4 layers or a plurality of λ/4 layers, preferably one λ/4 layer. The optical retardation of the λ/4 layer is preferably about 140 nm.

The layer thickness (d) of the mesogenic modulation medium is preferably from 0.1 μm to 5000 μm (i.e. 5 mm), particularly preferably from 0.5 µm to 1000 µm (i.e. 1 mm); particularly preferably from 1.0 µm to 100 µm and very particularly preferably from 3.0 µm to 30 µm and in particular from 3.5 µm to 20 µm. In a preferred embodiment, the layer thickness of the mesogenic modulation medium is preferably from 0.5 µm to 50 µm, particularly preferably from 1.0 µm to 20 µm and very particularly preferably from 1.0 µm to 8.0 µm.

The light modulation element according to the invention may additionally contain one or more further conventional optical elements, such as birefringent layers (for example compensation layers), diffuser layers and elements for increasing the brightness and/or the light yield, or viewing-angle dependence, where this list is not definitive.

The light modulation elements according to the invention are characterised by good contrast, which is highly and virtually predominantly dependent on the properties of the polarisers used. For comparison with conventional TN cells, the TN cells used here have an optical retardation of 0.50 µm, positive contrast and the absorption axis of the polarisers perpendicular to the preferential alignment of the nematic liquid crystals at the adjacent substrate and contain non-chiral liquid crystals. If the same polarisers are used in the light modulation elements according to the invention and in these conventional TN cells, the contrast of the light modulation elements according to the invention is 40% or more greater than that of the TN cells.

The viewing-angle dependence of the contrast of the light modulation elements according to the invention is very good. It is significantly better than that of the known ECB cells. It is more comparable with the commercially available IPS displays (for example from Hitachi and NEC, both Japan) and MVA displays (for example from Fujitsu, Japan). It is much lower than that of the TN displays mentioned in the last paragraph. Thus, an isocontrast curve for a given contrast ratio in the light modulation elements according to the invention generally includes an angle range which is more than twice as large, often even more than three times as large, as the corresponding isocontrast curve for the same contrast ratio in the TN display.

The response times of the light modulation elements according to the invention are very short. They are generally at values of 1 ms or less, preferably at 0.5 ms or less, particularly preferably at 0.1 ms or less.

It is particularly advantageous that on switching between different grey shades, both the response time for switching off and also, particularly surprisingly, that for switching on are virtually independent of the addressing voltage used. This represents a significant advantage over conventional light modulation elements, such as liquid-crystal cells, for example TN cells.

In order to investigate the switching behaviour on addressing of grey shades, the light modulation elements according to the invention were in each case switched, for example, from a voltage $V_{10}$ to each of $V_{90}$, $V_{80}$, $V_{70}$ to $V_{20}$. The switch-on time from the time of switching on of the new voltage until 90% of the respective maximum transmission change has been reached is, to a first approximation, identical in all cases for all these switching operations.

Electro-optical displays in accordance with the present invention contain one or more light modulation elements according to the invention. In a preferred embodiment, these are addressed by means of an active matrix.

In another preferred embodiment, the light modulation elements according to the invention are addressed in so-called "field sequential mode". Here, the switching elements are illuminated successively with light of different colours synchronously to the addressing. In order to produce the pulsed coloured light, a colour wheel, stroboscope lamps or flash lamps, for example, can be employed.

Electro-optical displays in accordance with the present invention may, in particular if they are used for television screens, computer monitors or the like, contain a coloured filter for the display of coloured images. This coloured filter advantageously consists of a mosaic of filter elements of different colours. Typically, an element of the coloured-filter mosaic of a colour is assigned to each electro-optical switching element.

The mesogenic media in accordance with the present invention preferably have a nematic phase. However, it is also possible to use media in which the temperature range of the nematic phase is so narrow that in practical terms a transition from the crystalline phase or from the smectic phase into the isotropic phase takes place.

The clearing point of the mesogenic media having a nematic phase is preferably in the range from −20° C. to 80° C., particularly preferably in the range from 0° C. to 60° C. and very particularly preferably in the range from 20° C. to 60° C. In the case of displays having back-lighting, the clearing point is preferably in the range from 10° C. to 70° C. and particularly preferably in the range from 30° C. to 50° C.

The nematic phase is preferably stable down to −10° C., particularly preferably down to −30° C. and very particularly preferably down to 40° C.

The mesogenic media in accordance with the present invention preferably have a birefringence ($\Delta n$) of 0.100 or more, particularly preferably of 0.150 or more, very particularly preferably of 0.200 or more, in the nematic phase at a temperature of 4 degrees below the clearing point. The value for the birefringence is as good as unlimited for the application according to the invention. In practical terms, however, it is generally 0.500 or less and usually 0.450 or less. The value for the birefringence of the media according to the invention is measured here in the nematic phase at a temperature of 4° below the clearing point. If the medium is not nematically stable at this temperature or at least supercoolable in the nematic phase down to this temperature, the birefringence of a mixture of 15% of the medium and 85% of the nematic mixture ZLI-4792 from Merck KGaA is determined at 20° C., and the value of the pure medium extrapolated from the change compared with the mixture ZLI-4792.

The mesogenic media in accordance with the present invention preferably have a dipole moment of 4 debye or more, particularly preferably 6 debye or more and particularly preferably 8 debye or more.

For the light modulation elements in accordance with the present invention, it is possible to use both mesogenic modulation media which have a positive dielectric anisotropy ($\Delta \epsilon$) in the mesophase and those which have a negative dielectric anisotropy. Preference is given to the use of mesogenic modulation media which have a positive dielectric anisotropy ($\Delta \epsilon$) in the mesophase.

If the mesogenic modulation media have a positive dielectric anisotropy, this has a value of preferably 15 or more, particularly preferably 30 or more and very particularly preferably 45 or more at 1 kHz and a temperature of 4° below the clearing point, preferably in the nematic phase. If the medium does not have a nematic phase or it is not in the nematic phase at a temperature of 4° below the clearing point, its dielectric anisotropy, like the birefringence, is determined by extrapolation of the values of a mixture of 15% in the mixture ZLI-4792.

If the mesogenic modulation media have negative dielectric anisotropy, this has a value of preferably −5 or less, particularly preferably −7 or less and very particularly preferably −10 or less.

Particular preference is given to modulation media having a positive dielectric anisotropy.

The mesogenic media in accordance with the present invention preferably consist of from two to 40 compounds, particularly preferably from five to 30 compounds and very particularly preferably from seven to 25 compounds.

The mesogenic media according to the invention of positive dielectric anisotropy in accordance with the present invention preferably comprise

- a component A consisting of one or more compounds of very highly positive dielectric anisotropy of 30 or more,
- optionally a component B consisting of one or more compounds of highly positive dielectric anisotropy of from 10 to <30,
- optionally a component C consisting of one or more compounds of moderately positive dielectric anisotropy of from >1.5 to <10,
- optionally a component D consisting of one or more dielectrically neutral compounds having a dielectric anisotropy in the range from −1.5 to +1.5, and
- optionally a component E consisting of one or more compounds having a negative dielectric anisotropy of less than −1.5.

Component A of these media preferably comprises one or more compounds of the formula I and particularly preferably consists predominantly and very particularly preferably consists virtually completely of one or more compounds of the formula I

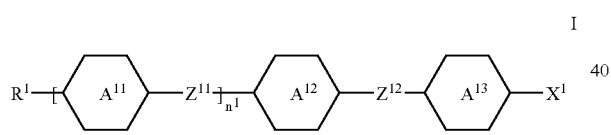

in which $R^1$ is n-alkyl or n-alkoxy, each having from 1 to 7 carbon atoms, or alkenyl, alkenyloxy, alkynyl or alkoxyalkyl, each having from 2 to 7 carbon atoms,

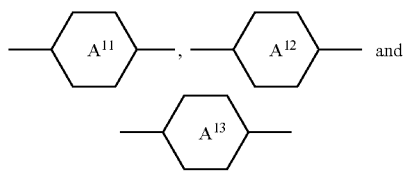

are each, independently of one another,

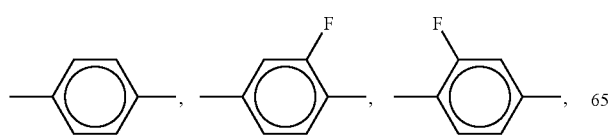

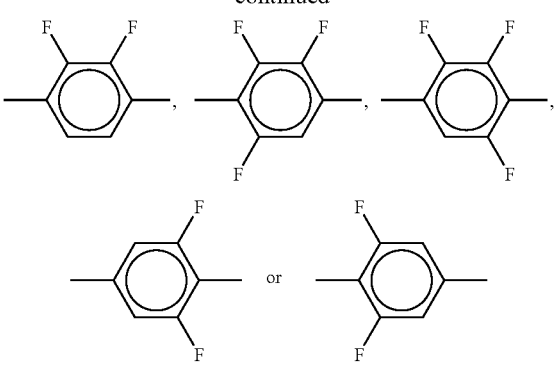

and one of

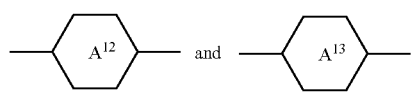

is alternatively

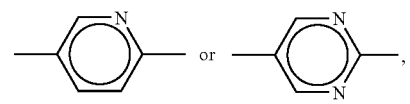

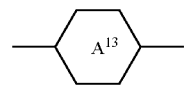

is alternatively

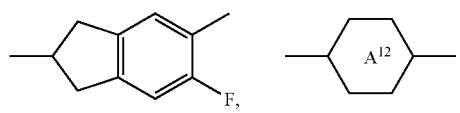

is alternatively

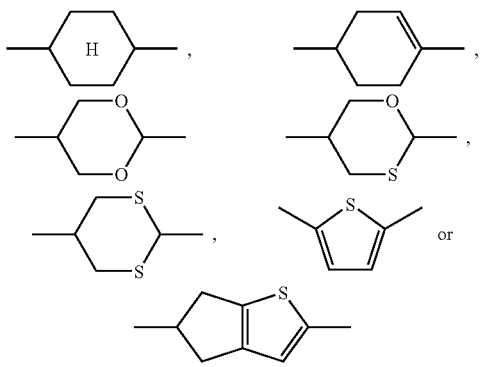

and, if present,

is alternatively

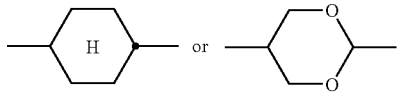

$Z^{11}$ and $Z^{12}$ are each, independently of one another, a single bond, —CO—O—, trans —CH=CH—, —CH=CF—, —CF=CH—, —CF=CF—, —CH=CH—CO—O—, —CF=CF—CO—O—, —CF=CH—CO—O—, —CH=CF—CO—O—, —CF$_2$—O—, —O—CF$_2$— or —C≡C—, $X^1$ is F, —OCF$_3$, —CF$_3$, —OCF$_2$H, Cl, CN, —C≡C—CN or NCS, preferably CN, —C≡C—CN or NCS, and $n^1$ is 0 or 1, where in the case where $X^1$=F, the phenyl rings carry a total of at least 2, preferably at least 3, further F atoms, in the case where $X^1$=—OCF$_3$, —CF$_3$, —OCF$_2$H or Cl, the phenyl rings carry a total of at least 1 further F atom, preferably at least 2 further F atoms, and in the case where $X^1$=CN, —C≡C—CN or NCS, the phenyl rings preferably carry at least 1 further F atom.

The media according to the invention preferably comprise one or more compounds selected from the group consisting of the compounds of the formulae I-1 to I-7 and/or one or more compounds selected from the group consisting of the compounds of the formulae II-1 to II-5, which are likewise sub-formulae of the formula I.

I-1

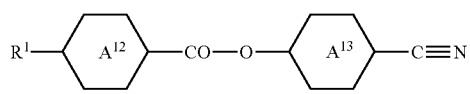

I-2

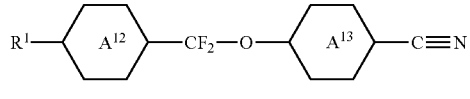

I-3

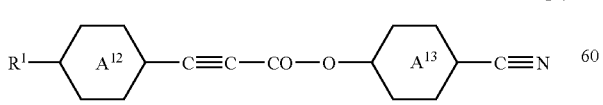

I-4

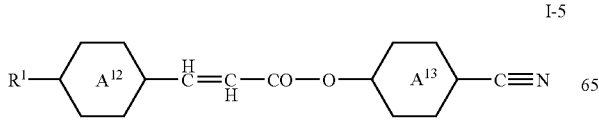

I-5

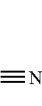

I-6

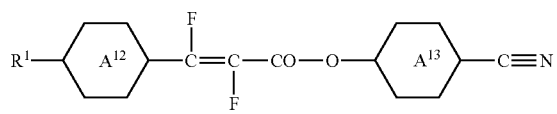

I-7

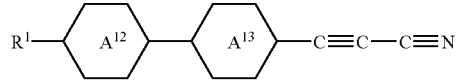

II-1

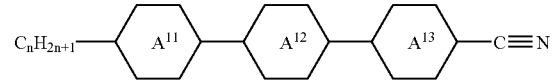

II-2

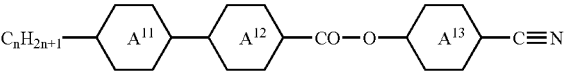

II-3

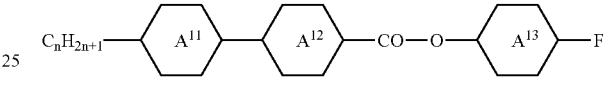

II-4

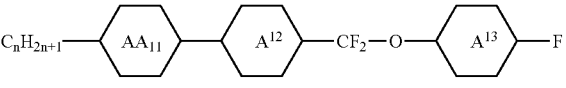

II-5

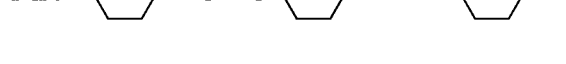

in which the parameters are as defined above under the formula I.

The media according to the invention particularly preferably comprise one or more compounds selected from the group consisting of the compounds of the formulae I-1a to I-1e, I-2a to I-2c, I-3a to I-3c, I-4a to I-4c, I-5a to I-5c, I-6a to I-6c and I-7a to I-7c and/or one or more compounds selected from the group consisting of the compounds of the formulae II-1a to II-1c, II-2a to II-2c, Ii-3a, II-3b, II-4a, II-4b, II-5a and II-5b.

I-1a

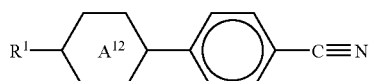

I-1b

I-1c

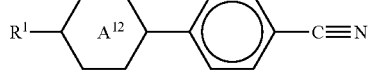

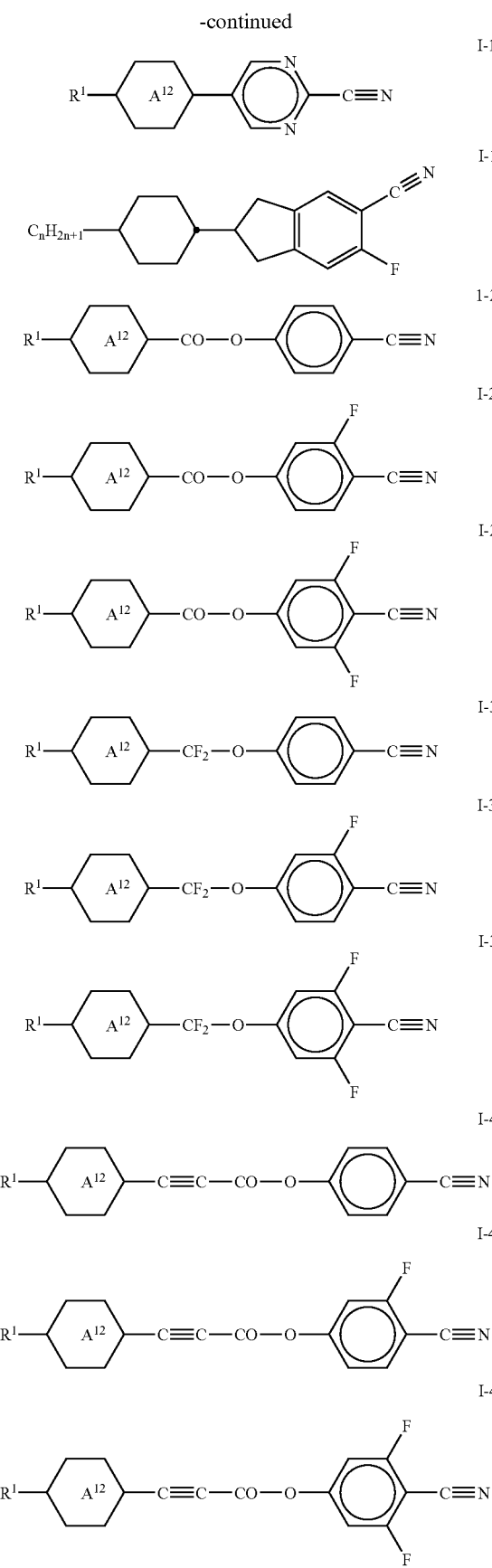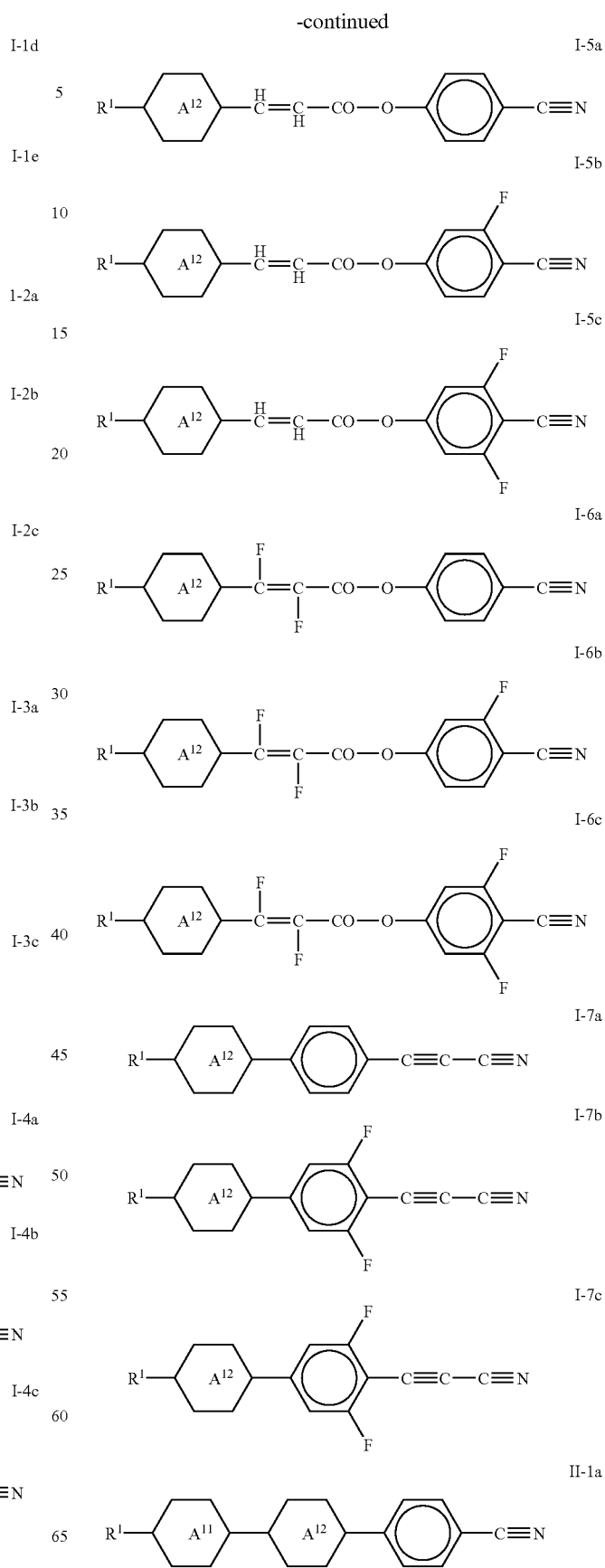

-continued
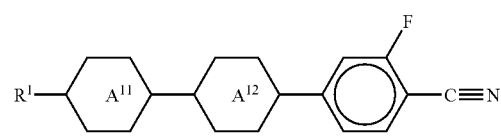
II-1b
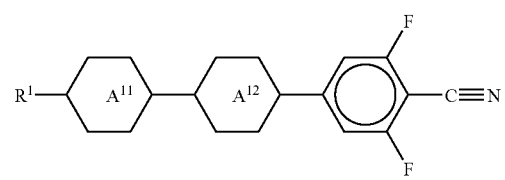
II-1c
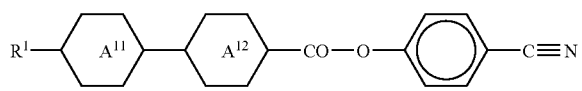
II-2a
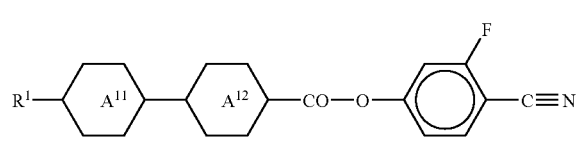
II-2b
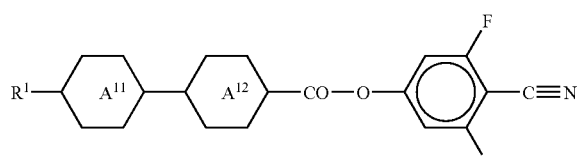
II-2c
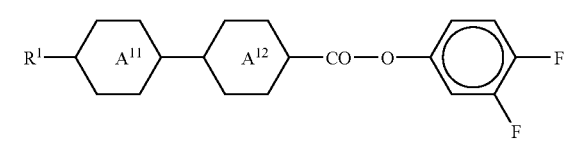
II-3a
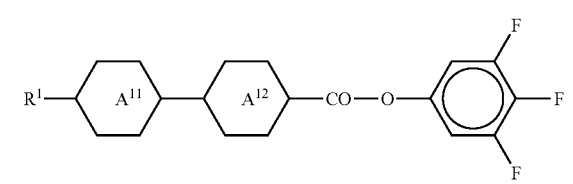
II-3b
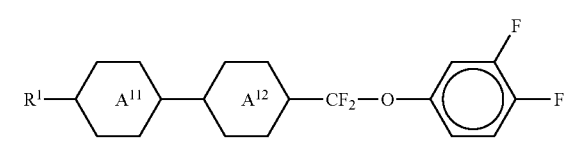
II-4a
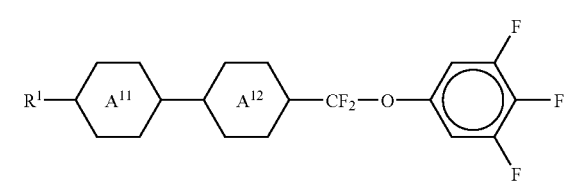
II-4b
-continued
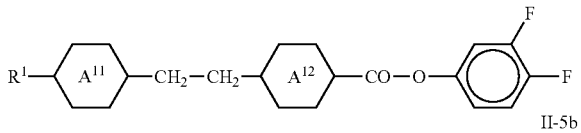
II-5a
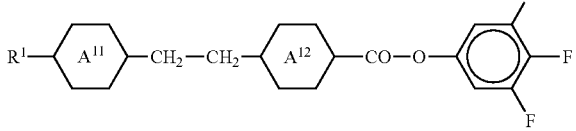
II-5b
in which the parameters are as defined above under the formula I.
The compounds of the formulae I-1a to I-1e are preferably selected from the group consisting of the compounds of the formulae I-1a-1 to I-1a-6, I-1b-1 to I-1b-9, I-1c-1 to I-1c-9, I-1d-1 to I-1d-5 and I-1e-1 and I-1e-2.
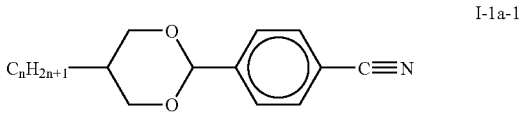
I-1a-1
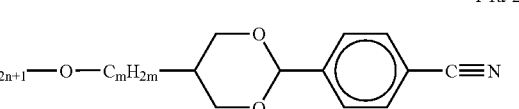
I-1a-2
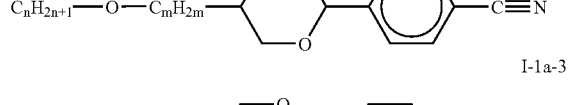
I-1a-3
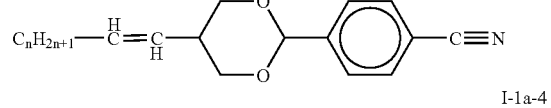
I-1a-4
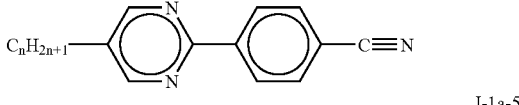
I-1a-5
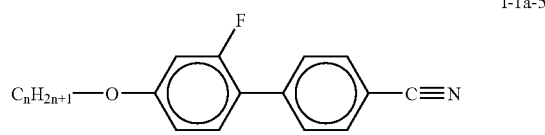
I-1a-6
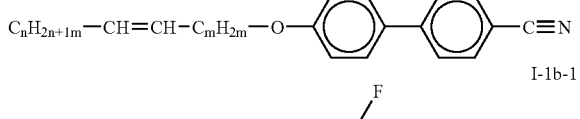
I-1b-1
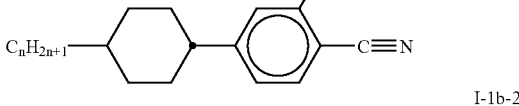
I-1b-2
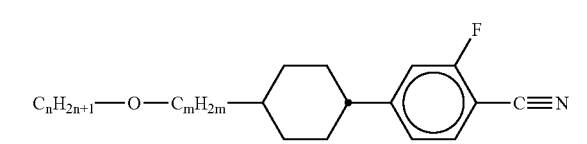

-continued
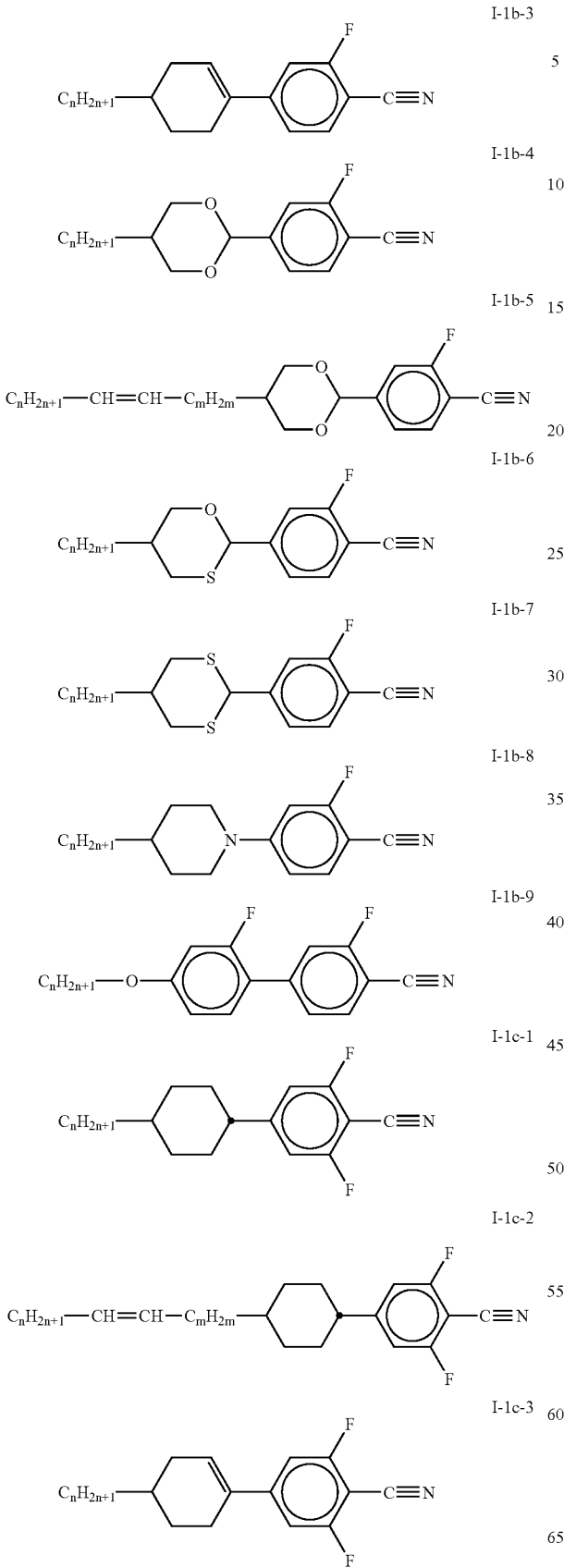
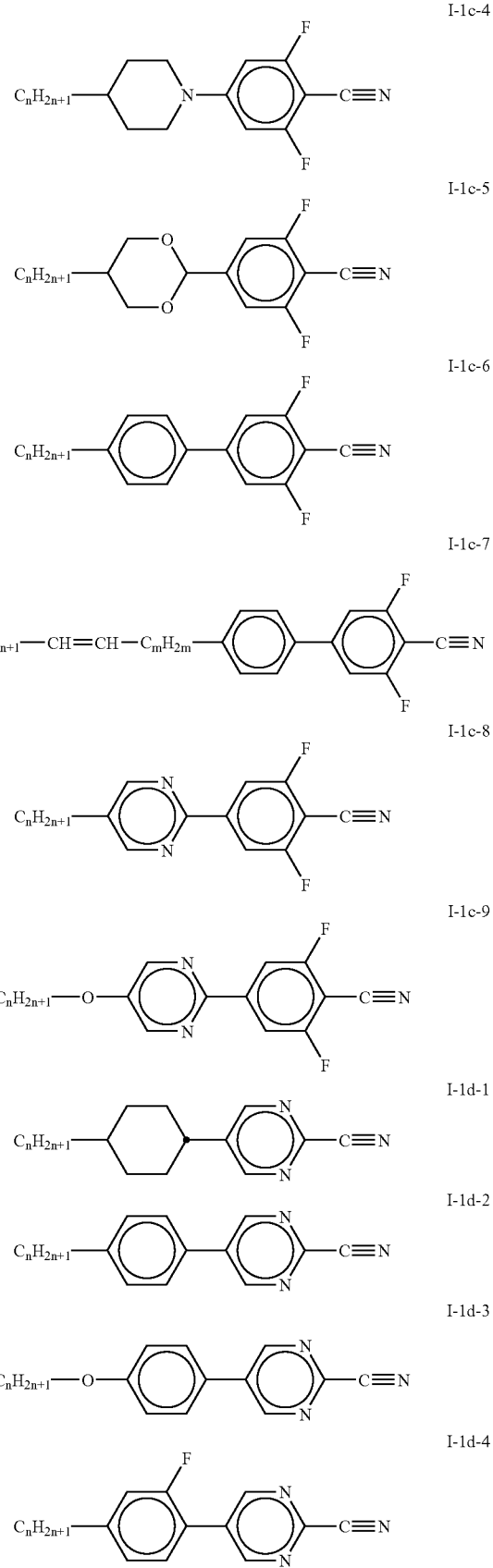

-continued
I-1d-5
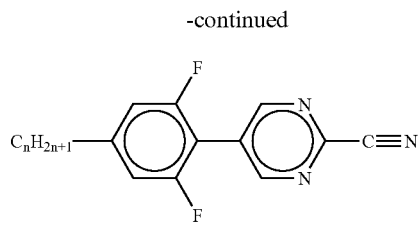
I-1e-1
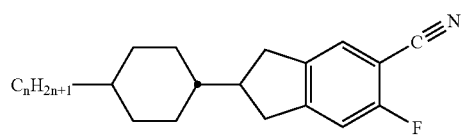
I-1e-2
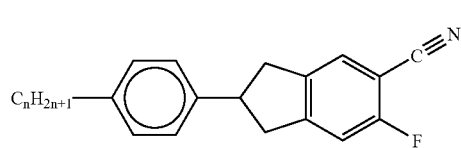
in which
n is an integer from 0 to 7, preferably from 1 to 7,
m is an integer from 0 to 5,
n+m is an integer from 0 to 7, preferably from 1 to 5.
The compounds of the formulae I-2a to I-2c are preferably selected from the group consisting of the compounds of the formulae I-2a-1 to I-2a-5, I-2b-1 to I-2b-9 and I-2c-1 to I-2c-17.
I-2a-1
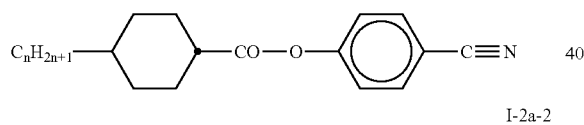
I-2a-2
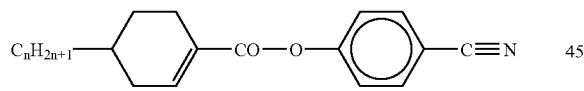
I-2a-3
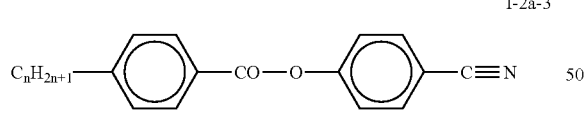
I-2a-4
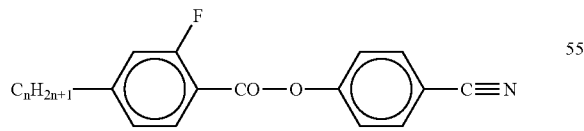
I-2a-5
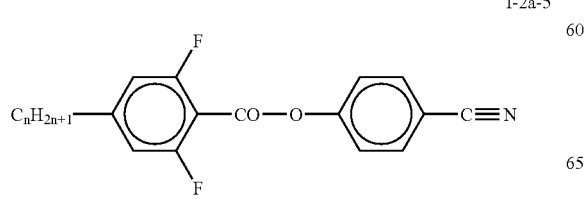
-continued
I-2b-1
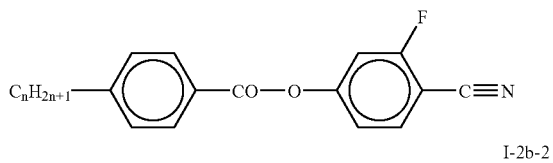
I-2b-2
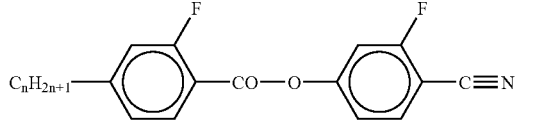
I-2b-3
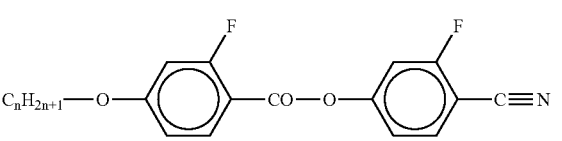
I-2b-4
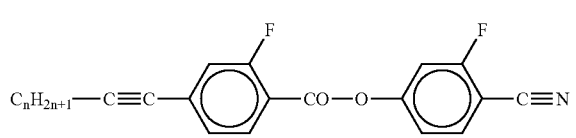
I-2b-5
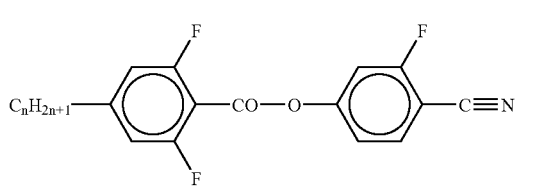
I-2b-6
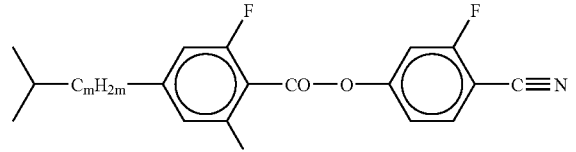
I-2b-7
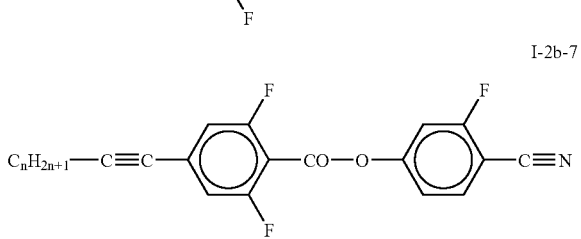
I-2b-8
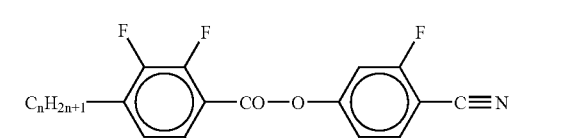
I-2b-9

-continued
I-2c-1
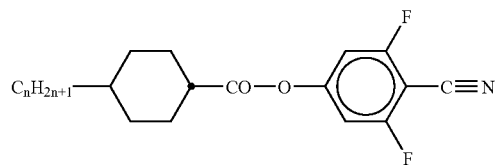
I-2c-2
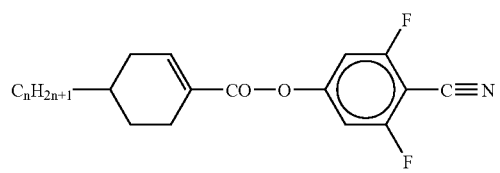
I-2c-3
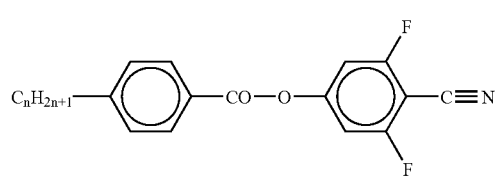
I-2c-4
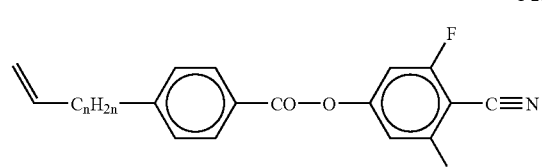
I-2c-5
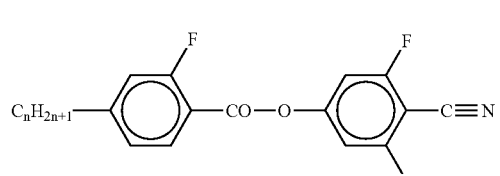
I-2c-6
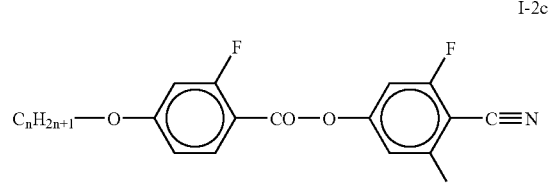
I-2c-7
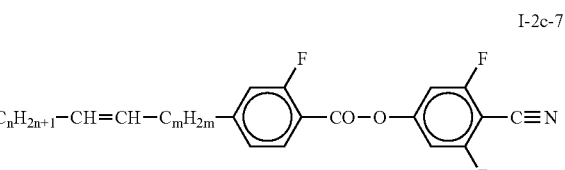
I-2c-8
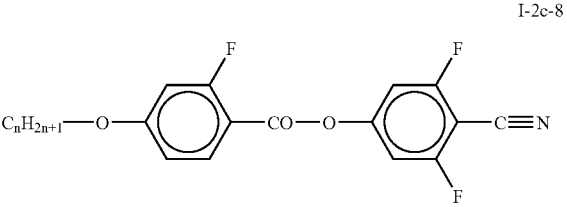
-continued
I-2c-9
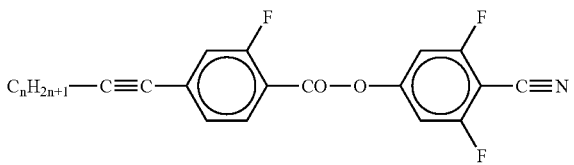
I-2c-10
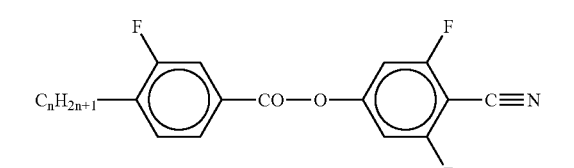
I-2c-11
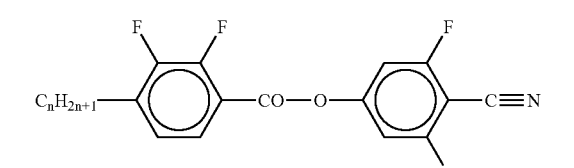
I-2c-12
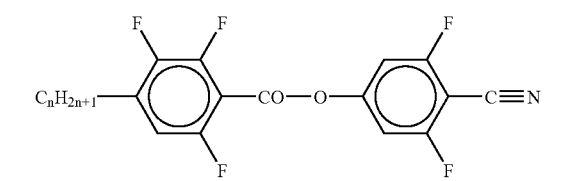
I-2c-13
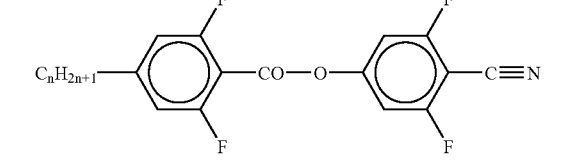
I-2c-14
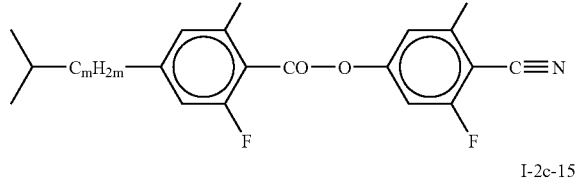
I-2c-15
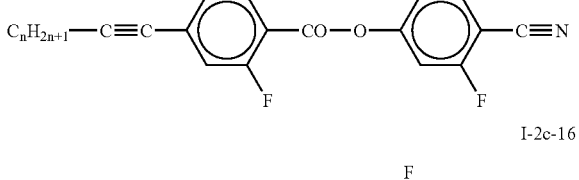
I-2c-16

-continued

I-2c-17
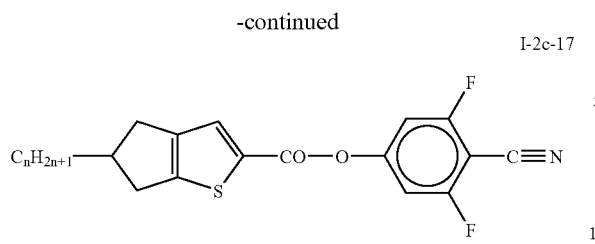

in which n is an integer from 0 to 7, preferably from 0 to 5 and particularly preferably from 1 to 5, m is an integer from 0 to 5, and n+m is an integer from 0 to 7, preferably from 1 to 5.

The compounds of the formulae I-3a to I-3c are preferably selected from the group consisting of the compounds of the formulae I-3a-1 to I-3a-4, I-3b-1 to I-3b-4 and I-3c-1 to I-3c-4.

I-3a-1
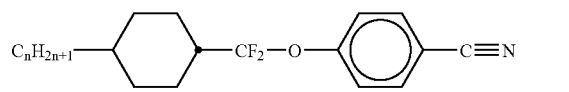

I-3a-2

I-3a-3
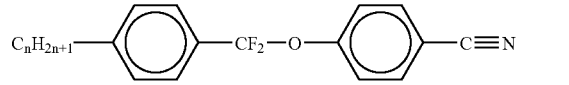

I-3a-4

I-3b-1
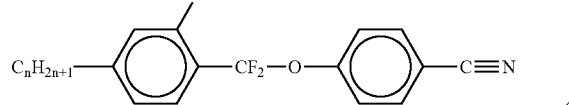

I-3b-2

I-3b-3
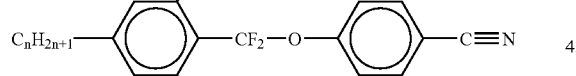

-continued

I-3b-4
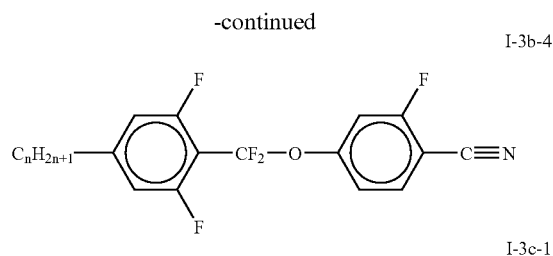

I-3c-1

I-3c-2
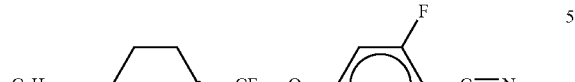

I-3c-3

I-3c-4
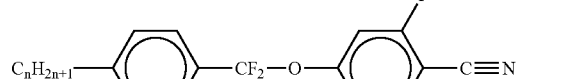

in which n is an integer from 0 to 7, preferably from 0 to 5 and particularly preferably from 1 to 5.

The compounds of the formulae I-4a to I-4c are preferably selected from the group consisting of the compounds of the formulae I-4a-1 to I-4a-3, I-4b-1 to I-4b-4 and I-4c-1 to I-4c-3.

I-4a-1
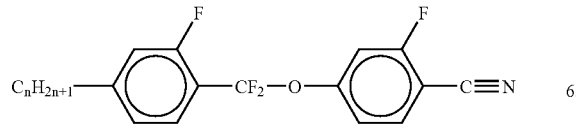

I-4a-2

I-4a-3

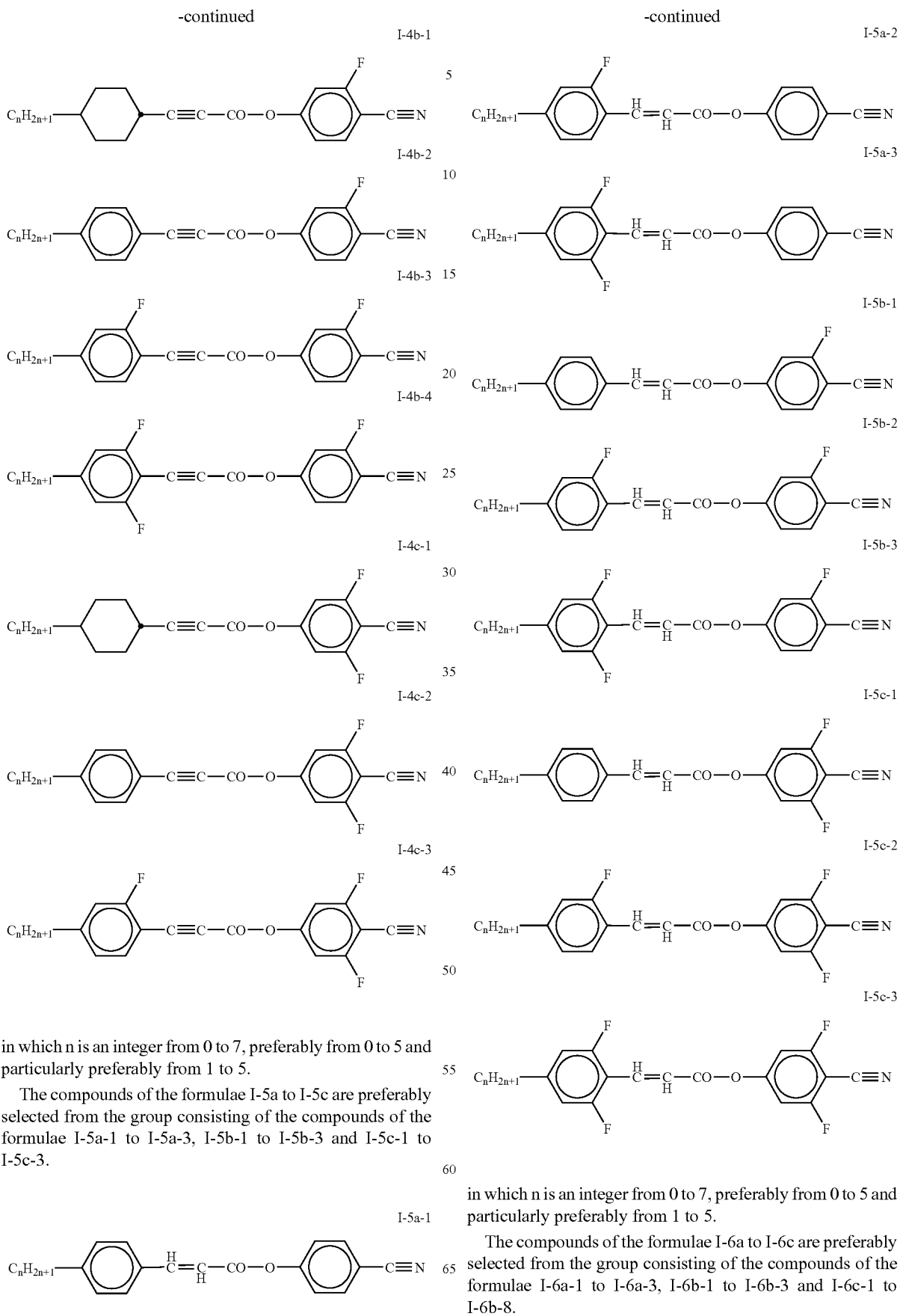

in which n is an integer from 0 to 7, preferably from 0 to 5 and particularly preferably from 1 to 5.

The compounds of the formulae I-5a to I-5c are preferably selected from the group consisting of the compounds of the formulae I-5a-1 to I-5a-3, I-5b-1 to I-5b-3 and I-5c-1 to I-5c-3.

in which n is an integer from 0 to 7, preferably from 0 to 5 and particularly preferably from 1 to 5.

The compounds of the formulae I-6a to I-6c are preferably selected from the group consisting of the compounds of the formulae I-6a-1 to I-6a-3, I-6b-1 to I-6b-3 and I-6c-1 to I-6b-8.

I-6a-1
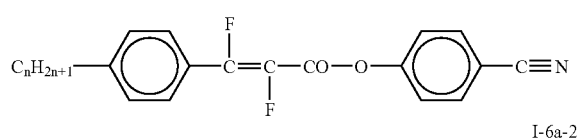

I-6a-2
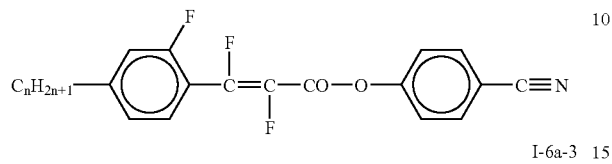

I-6a-3
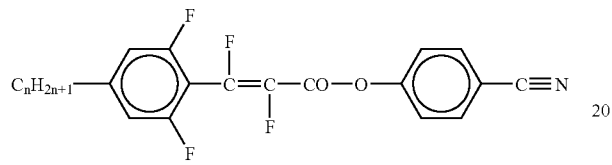

I-6b-1
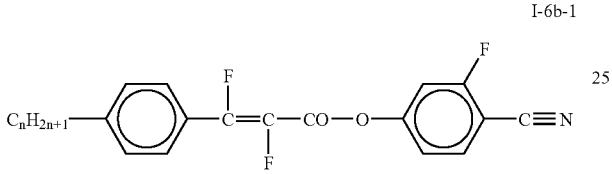

I-6b-2
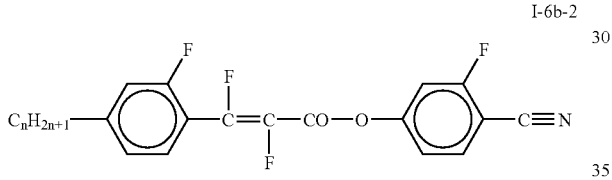

I-6b-3
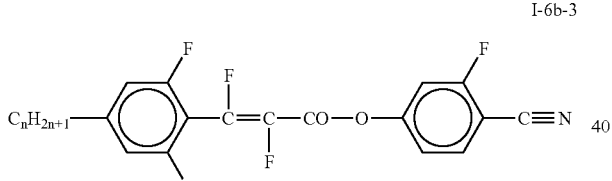

I-6c-1
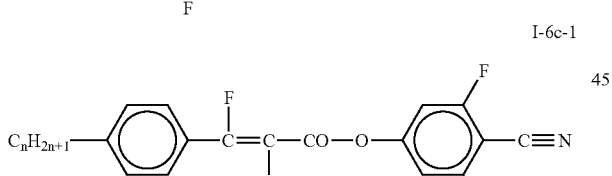

I-6c-2
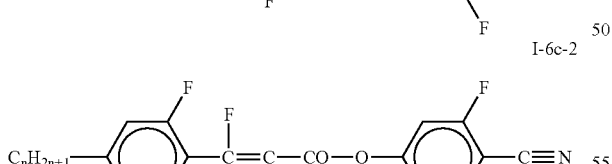

I-6c-3
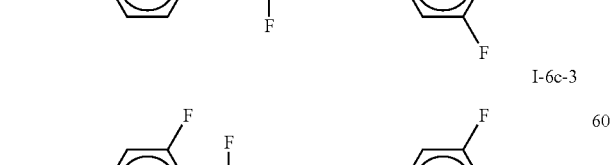

in which n is an integer from 0 to 7, preferably from 0 to 5 and particularly preferably from 1 to 5.

The compounds of the formulae I-7a to I-7c are preferably selected from the group consisting of the compounds of the formulae I-7a-1 and I-7a-2, I-7b-1 and I-7b-2 and I-7c-1 and I-7c-2.

I-7a-1
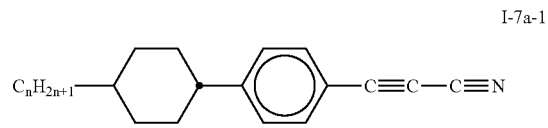

I-7a-2
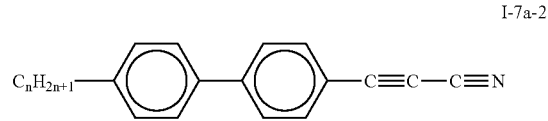

I-7b-1
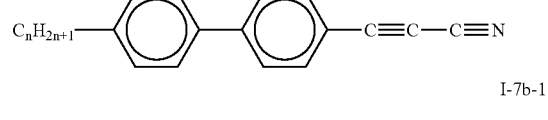

I-7b-2
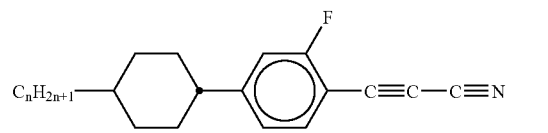

I-7c-1
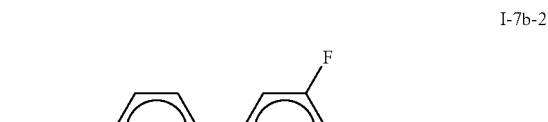

I-7c-2
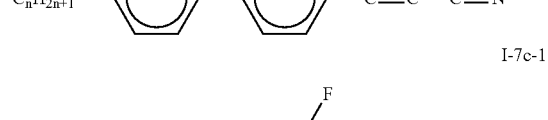

in which n is an integer from 0 to 7, preferably from 0 to 5 and particularly preferably from 1 to 5.

The media according to the invention particularly preferably comprise one or more compounds selected from the group consisting of the compounds of the formulae II-1c-1, II-2c-1, II-3b-1, II-4b-1 and II-5b-1.

II-1c-1
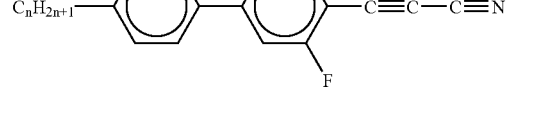

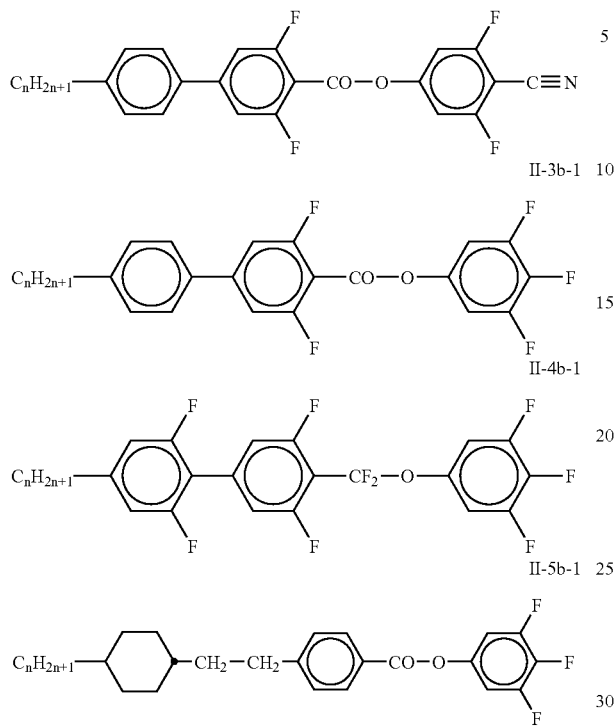

in which n is an integer from 0 to 7, preferably from 0 to 5 and particularly preferably from 1 to 5.

The media according to the invention preferably comprise one or more compounds selected from the group consisting of the compounds of the formulae I-1 to I-7 and one or more compounds selected from the group consisting of the compounds of the formulae II-1 to II-5.

The following table shows some examples of compounds of the particularly preferred formulae which are particularly suitable for the preparation of media according to the invention.

TABLE 1

Examples of preferred compounds

| No. | Formula | N | m | Phase range |
|---|---|---|---|---|
| 1 | I-1a-3 | 1 | — | C 93 I |
| 2 | I-1a-4 | 4 | — | C 63 I |
| 3 | I-1a-4 | 5 | — | C 71 N (53.3) I |
| 4 | I-1a-4 | 7 | — | C 46 N 51.4 I |
| 5 | I-1a-5 | 1 | — | C 82 N (45.3) I |
| 6 | I-1a-5 | 2 | — | C 77 N (49.3) I |
| 7 | I-1a-5 | 3 | — | C 53 N (17.9) I |
| 8 | I-1a-6 | — | 1 | C 64 I |
| 9 | I-1b-2 | 1 | 3 | C 42 I |
| 10 | I-1b-3 | 2 | — | C 59 I |
| 11 | I-1b-3 | 3 | — | C 49 I |
| 12 | I-1b-3 | 4 | — | C 44 I |
| 13 | I-1b-3 | 5 | — | C 42 N (−17.0) I |
| 14 | I-1b-5 | 1 | 0 | C 63 I |
| 15 | I-1b-6 | 3 | — | C 69 I |
| 16 | I-1b-7 | 5 | — | C 94 I |
| 17 | I-1b-8 | 3 | — | C 54 I |
| 18 | I-1b-9 | 3 | — | C 76 I |
| 19 | I-1b-9 | 4 | — | C 41 I |
| 20 | I-1c-1 | 2 | — | C 46 I |
| 21 | I-1c-1 | 3 | — | C 57 I |
| 22 | I-1c-2 | 0 | 0 | C 41 I |
| 23 | I-1c-2 | 1 | 0 | C 43 I |
| 24 | I-1c-3 | 5 | — | C 46 I |
| 25 | I-1c-4 | 1 | — | C 51 I |
| 26 | I-1c-4 | 3 | — | C 67 I |
| 27 | I-1c-5 | 2 | — | C 43 I |
| 28 | I-1c-5 | 3 | — | C 43 I |
| 29 | I-1c-6 | 5 | — | C 23 I |
| 30 | I-1c-7 | 0 | 2 | C 64 I |
| 31 | I-1c-8 | 4 | — | C 78 I |
| 32 | I-1c-8 | 5 | — | C 78 I |
| 33 | I-1c-9 | 4 | — | C 85 I |
| 34 | I-1d-1 | 5 | — | C 84 I |
| 35 | I-1d-5 | 3 | — | C 85 I |
| 36 | I-1d-5 | 5 | — | C 36 I |
| 37 | I-1e-1 | 3 | — | C 117 I |
| 38 | I-2a-3 | 2 | — | C 77 N (43.1) I |
| 39 | I-2a-3 | 3 | — | C 100 N (46) I |
| 40 | I-2b-1 | 2 | — | C 78 N (11) I |
| 41 | I-2b-1 | 3 | — | C 70 N (19) I |
| 42 | I-2b-1 | 4 | — | C 13 N (6.7) I |
| 43 | I-2b-1 | 5 | — | C 30 N (23.8) I |
| 44 | I-2b-1 | 6 | — | C 35 N (17) I |
| 45 | I-2b-1 | 7 | — | C 29 N (28) I |
| 46 | I-2b-2 | 4 | — | C 33 I |
| 47 | I-2b-3 | 4 | — | C 57 N (21.8) I |
| 48 | I-2b-4 | 3 | — | C 55 I |
| 49 | I-2b-4 | 4 | — | C 49 I |
| 50 | I-2b-4 | 5 | — | C 46 I |
| 51 | I-2b-5 | 3 | — | C 67 I |
| 52 | I-2b-5 | 5 | — | C 41 I |
| 53 | I-2b-5 | 6 | — | $T_g$-59 C 31 N (−30) I |
| 54 | I-2b-6 | — | 2 | not determined |
| 55 | I-2b-7 | 3 | — | C 59 I |
| 56 | I-2b-7 | 4 | — | C 39 I |
| 57 | I-2b-7 | 5 | — | C 31 I |
| 58 | I-2b-8 | 4 | — | C 47 I |
| 59 | I-2b-9 | 4 | — | $T_g$-57 C 19 I |
| 60 | I-2c-1 | 3 | — | C 61 I |
| 61 | I-2c-2 | 5 | — | C 31 I |
| 62 | I-2c-3 | 3 | — | C 77 I |
| 63 | I-2c-3 | 5 | — | C 47 I |
| 64 | I-2c-4 | 0 | 1 | C 77 I |
| 65 | I-2c-4 | 0 | 2 | C 37 N (8.2) I |
| 66 | I-2c-4 | 0 | 3 | not determined |
| 67 | I-2c-5 | 4 | — | C 52 I |
| 68 | I-2c-6 | 4 | — | C 70 I |
| 69 | I-2c-7 | 0 | 2 | C 47 N (1.0) I |
| 70 | I-2c-9 | 3 | — | C 52 I |
| 71 | I-2c-9 | 4 | — | C 39 I |
| 72 | I-2c-9 | 5 | — | C 39 I |
| 73 | I-2c-10 | 4 | — | C 60 I |
| 74 | I-2c-11 | 3 | — | C 50 I |
| 75 | I-2c-12 | 4 | — | C 56 I |
| 76 | I-2c-13 | 3 | — | C 80 I |
| 77 | I-2c-13 | 4 | — | C 59 I |
| 78 | I-2c-14 | — | 2 | C 60 I |
| 79 | I-2c-15 | 3 | — | C 69 I |
| 80 | I-2c-15 | 4 | — | C 47 I |
| 81 | I-2c-15 | 5 | — | C 33 I |
| 82 | I-2c-16 | 4 | — | $T_g$-54 $X_1$-35 $X_2$-7 I |
| 83 | I-2c-17 | 4 | — | C 78 N (50.8) I |
| 84 | I-2c-17 | 5 | — | C 72 N (55.0) I |
| 85 | I-3b-4 | 2 | — | C 35 I |
| 86 | I-3c-1 | 3 | — | $T_g$-72 C 17 N (−18) I |
| 87 | I-4b-1 | 3 | — | C 50 I |
| 88 | I-4c-1 | 3 | — | $T_g$-47 C 30 I |
| 89 | I-4c-2 | 3 | — | $T_g$-37 C 63 I |
| 90 | I-4c-2 | 5 | — | $T_g$-46 C 56 I |
| 91 | I-5b-3 | 3 | — | C 75 N (68.0) I |
| 92 | I-6a-1 | 3 | — | C 56 N 65.1 I |
| 93 | I-6c-1 | 2 | — | C 76 I |
| 94 | I-7b-1 | 2 | — | C 39 N 46.4 I |
| 95 | I-7c-1 | 2 | — | C 44 I |

TABLE 1-continued

Examples of preferred compounds

| No. | Formula | N | m | Phase range |
|---|---|---|---|---|
| 96 | I-7c-2 | 0 | 0 | C 61 N (48.8) I |
| 97 | I-7c-2 | 0 | 2 | C 57 N 78.9 I |
| 98 | I-7c-4 | 3 | — | C 75 N (51.0) I |
| 99 | I-7c-4 | 5 | — | C 61 N (48.8) I |
| 100 | II-1c-1 | 5 | — | C 85 N (75) I |
| 101 | II-2c-1 | 2 | — | C 59 N 95.2 I |
| 102 | II-3b-1 | 3 | — | C 78 $S_A$ (55) I |
| 103 | II-3b-1 | 5 | — | C 65 $S_A$ (62) I |
| 104 | II-4b-1 | 2 | — | C 82 I |
| 105 | II-5b-2 | 3 | — | C 77 I |

The mesogenic media of positive dielectric anisotropy in accordance with the present invention particularly preferably consist predominantly and very particularly preferably consist virtually completely of component A.

In a preferred embodiment, the mesogenic media of positive dielectric anisotropy in accordance with the present invention comprise one or more components selected from the group consisting of components B to D, preferably selected from the group consisting of components B and D.

Component D in these media preferably comprises one or more compounds. The mesogenic media of negative dielectric anisotropy in accordance with the present invention preferably comprise a component A' consisting of one or more compounds having a highly negative dielectric anisotropy of −5 or less, optionally a component B' consisting of one or more compounds having moderately negative dielectric anisotropy of from −1.5 to <−5, optionally a component C' consisting of one or more dielectrically neutral compounds having a dielectric anisotropy of from −1.5 to +1.5, and optionally a component D' consisting of one or more compounds having a positive dielectric anisotropy of greater than 1.5.

The mesogenic medium in accordance with the present invention may comprise further additives and chiral dopants in the usual concentrations. The total concentration of these further constituents is in the range from 0% to 10%, preferably in the range from 0.1% to 6%, based on the entire mixture. The concentrations of the individual compounds of these are in the range from 0.1 to 3%. The concentrations of these compounds and similar constituents of the mixture are not taken into account when specifying the concentration ranges of the other mixture constituents.

The media are obtained in the usual manner from the compounds. The compounds employed in smaller amounts are advantageously dissolved in the compounds employed in larger amounts. If the temperature during the mixing operation is increased above the clearing point of the predominant component, the completeness of the dissolution can easily be observed. However, the media according to the invention can also be prepared in other ways, for example by using pre-mixtures. Pre-mixtures which can be employed are, inter alia, homologue mixtures and/or eutectic mixtures. However, the pre-mixtures may also already be usable media themselves. This is the case in so-called two-bottle or multibottle systems.

In the present application, the following applies, unless explicitly stated otherwise.

Dielectrically positive compounds have a $\Delta\varepsilon$ of >1.5, dielectrically neutral compounds have a $\Delta\varepsilon$ in the range from $-1.5 \leq \Delta\varepsilon \leq 1.5$ and dielectrically negative compounds have a $\Delta\varepsilon$ of <−1.5. The same definitions also apply to components of mixtures and to mixtures.

The dielectric anisotropy $\Delta\varepsilon$ of the compounds is determined at 1 kHz and 20° C. by extrapolation of the values of a 10% solution of the respective compound in a host mixture to a proportion of the respective compound of 100%. The capacitances of the test mixtures are determined both in a cell having homeotropic edge alignment and in a cell having homogeneous edge alignment. The layer thickness of the two cell types is about 20 μm. The measurement is carried out using a rectangular wave having a frequency of 1 kHz and an effective voltage (rms, root mean square) of typically from 0.2 V to 1.0 V. In each case, the voltage used is lower than the capacitive threshold of the mixture investigated in each case.

For dielectrically positive compounds, the mixture ZLI-4792 is used and for dielectrically neutral and dielectrically negative compounds, the mixture ZLI-3086, both from Merck KGaA, Germany, is used as host mixture.

The term threshold voltage in the present application means the optical threshold and is indicated for a relative contrast of 10% ($V_{10}$). The mid-grey voltage and the saturation voltage are likewise determined optically and indicated for a relative contrast of 50% and 90% respectively. If the capacitive threshold voltage ($V_0$), also known as the Freedericks threshold, is indicated, this is stated explicitly.

The indicated ranges of values include the limit values.

The concentrations are given in % by weight and are based on the complete mixture. Temperatures are indicated in degrees Celsius and temperature differences in differential degrees Celsius. All physical properties were determined as in "Merck Liquid Crystals, Physical Properties of Liquid Crystals", Version of November 1997, Merck KGaA, Germany, and are indicated for a temperature of 20° C. The optical anisotropy ($\Delta n$), also known as the birefringence, is determined at a wavelength of 589.3 nm. The dielectric anisotropy ($\Delta\varepsilon$) is determined at a frequency of 1 kHz.

In a list of possible alternatives, where only the plural is indicated, this also means the singular.

In connection with details on the composition of the media or their components,

"comprise" means that the concentration of the respective material mentioned, i.e. of the component or of the compound, in the reference unit, i.e. the medium or the component, is preferably 10% or more, particularly preferably 20% or more and very particularly preferably 30% or more, "consist predominantly of" means that the concentration of the said material in the reference unit is preferably 50% or more, particularly preferably 60% or more and very particularly preferably 70% or more, and "consist virtually completely of" means that the concentration of the said material in the reference unit is preferably 80% or more, particularly preferably 90% or more and very particularly preferably 95% or more.

The dielectric properties, electro-optical properties (for example the threshold voltages) and the response times were determined in test cells produced at Merck KGaA, Darmstadt, Germany. The test cells for the determination of $\Delta\varepsilon$ had a layer thickness of 22 μm and a circular electrode of indium tin oxide (ITO) having an area of 1.13 cm$^2$ and a protective ring. For homeotropic alignment for the determination of $\varepsilon_\parallel$ cells having a homeotropically aligning polyimide alignment layer were used. Alternatively, lecithin (Merck KGaA) can be used as alignment agent. The cells for the determination of $\varepsilon_\perp$ had alignment layers of the polyimide AL-1054 from Japan Synthetic Rubber, Japan. The capacitances were generally measured using a Solatron 1260 frequency analyser with a rectangular wave and an effective voltage of 0.3 $V_{rms}$. The electro-optical investigations were carried out with white light. The characteristic voltages were determined with perpendicular observation.

In the present application, particularly in the examples described below, the structures of the chemical compounds are indicated by means of abbreviations. The meanings of the respective abbreviations are shown in Tables A and B below. All groups $C_nH_{2n+1}$ and $C_mH_{2m+1}$ are straight-chain alkyl groups having n and m carbon atoms respectively. Table B is self-evident per se since it indicates in each case the complete abbreviation for a formula of homologous compounds. In Table A, only the abbreviations for the core structures of the compound types are shown. The abbreviations for the respective individual compounds are composed of the respectively pertinent abbreviations of these for the core of the compound and the abbreviation for the groups $R^1$, $R^2$, $L^1$ and $L^2$ attached by means of a dash, as shown in the following table.

| Abbreviation for $R^1$, $R^2$, $L^1$, $L^2$ | $R^1$ | $R^2$ | $L^1$ | $L^2$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |

| Abbreviation for $R^1$, $R^2$, $L^1$, $L^2$ | $R^1$ | $R^2$ | $L^1$ | $L^2$ |
|---|---|---|---|---|
| nN.F | $C_nH_{2n+1}$ | CN | H | F |
| nN.F.F | $C_nH_{2n+1}$ | CN | F | F |
| nON.F.F | $OC_nH_{2n+1}$ | CN | F | F |
| nOF | $OC_nH_{2n+1}$ | F | H | H |
| nCl | $C_nH_{2n+1}$ | Cl | H | H |
| nCl.F | $C_nH_{2n+1}$ | Cl | H | F |
| nCl.F.F | $C_nH_{2n+1}$ | Cl | F | F |
| nF | $C_nH_{2n+1}$ | F | H | H |
| nF.F | $C_nH_{2n+1}$ | F | H | F |
| nF.F.F | $C_nH_{2n+1}$ | F | F | F |
| NmF | $C_nH_{2n+1}$ | $C_mH_{2m+1}$ | F | H |
| nCF$_3$ | $C_nH_{2n+1}$ | CF$_3$ | H | H |
| nOCF$_3$ | $C_nH_{2n+1}$ | OCF$_3$ | H | H |
| nOCF$_3$.F | $C_nH_{2n+1}$ | OCF$_3$ | H | F |
| nOCF$_3$.F.F | $C_nH_{2n+1}$ | OCF$_3$ | F | F |
| nOCF$_2$ | $C_nH_{2n+1}$ | OCHF$_2$ | H | H |
| nOCF$_2$.F | $C_nH_{2n+1}$ | OCHF$_2$ | H | F |
| nOCF$_2$.F.F | $C_nH_{2n+1}$ | OCHF$_2$ | F | F |
| nS | $C_nH_{2n+1}$ | NCS | H | H |
| nS.F | $C_nH_{2n+1}$ | NCS | H | F |
| nS.F.F | $C_nH_{2n+1}$ | NCS | F | F |
| rVsN | $C_rH_{2r+1}$—CH=CH—$C_sH_{2s}$— | CN | H | H |
| rOsN | $C_rH_{2r+1}$—O—$C_sH_{2s}$— | CN | H | H |
| nAm | $C_nH_{2n+1}$ | COOC$_m$H$_{2m+1}$ | H | H |

TABLE A

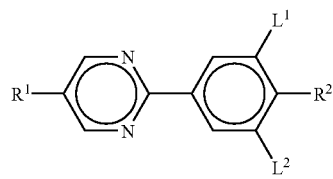

PYP

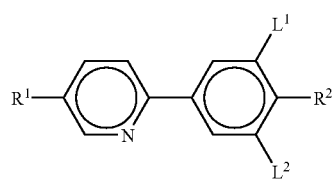

PYRP

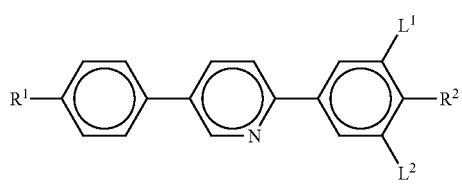

PPYRP

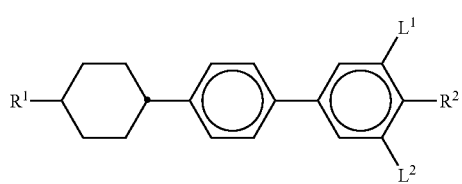

BCH

TABLE A-continued
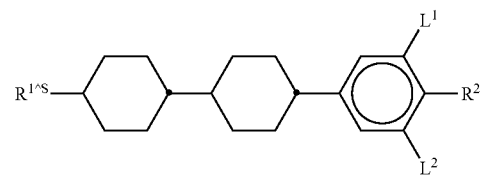
CCP
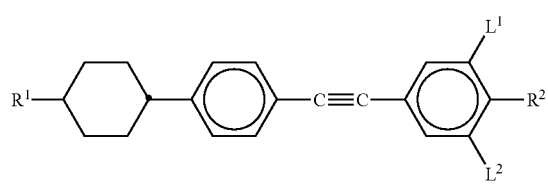
CPTP
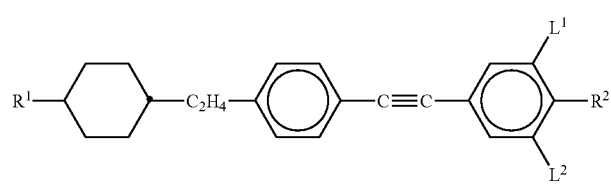
CEPTP
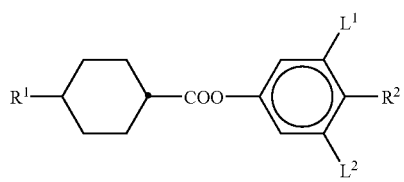
D
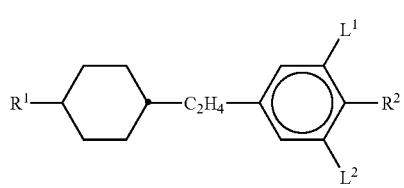
EPCH
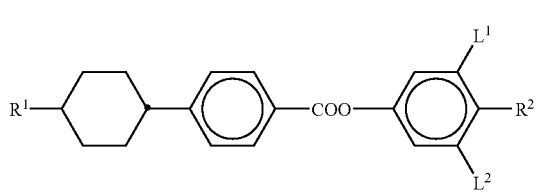
HP
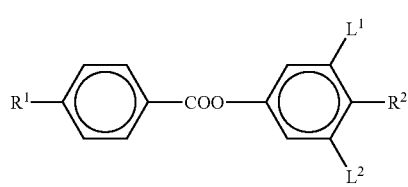
ME TABLE A-continued
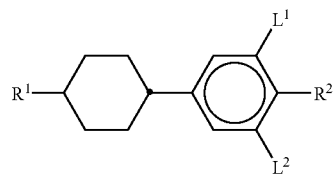
PCH
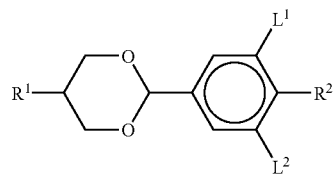
PDX
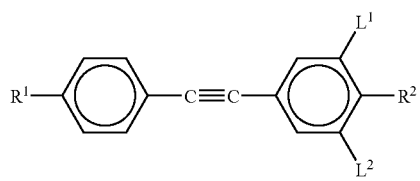
PTP
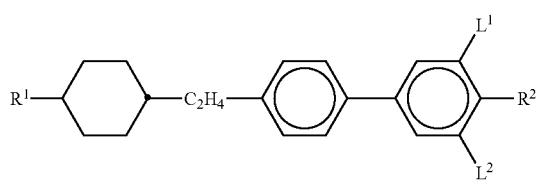
BECH
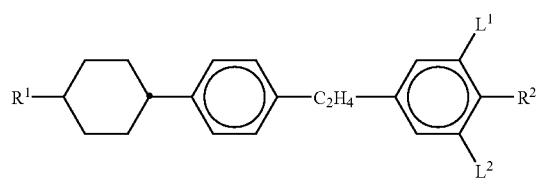
EBCH
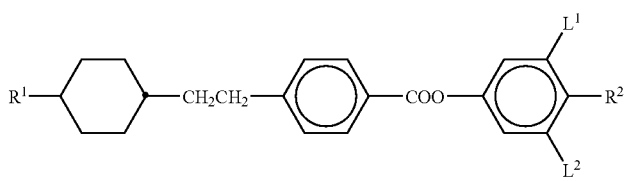
EHP
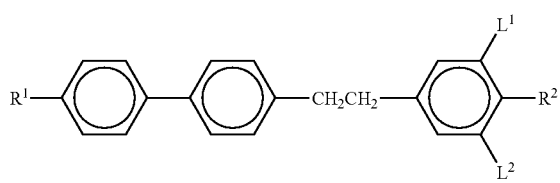
ET TABLE B
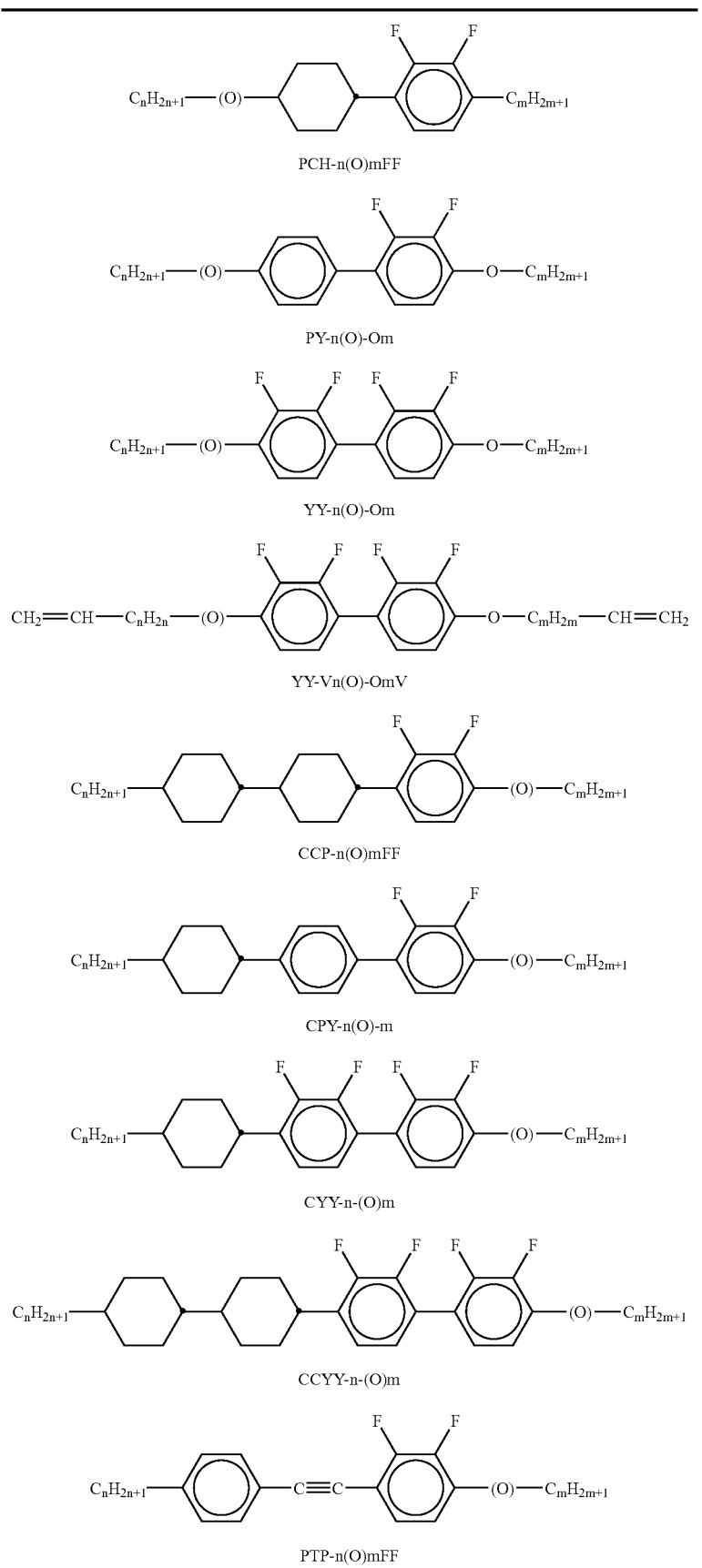

TABLE B-continued
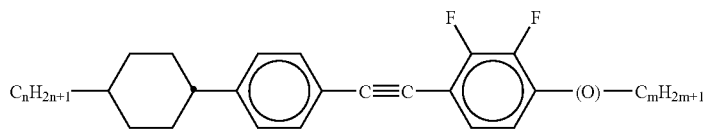
CPTP-n(O)mFF
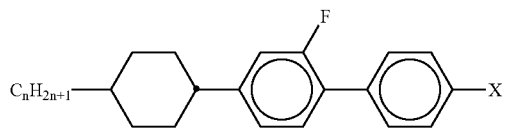
CGP-n-X
(X = particularly F, Cl, CN, NCS)
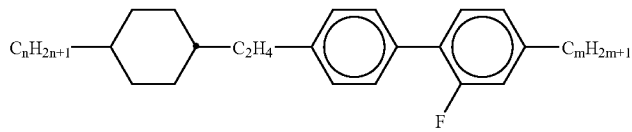
Inm
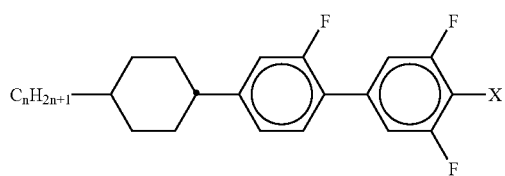
CGU-n-X
(X = particularly, F, Cl, CN, NCS)
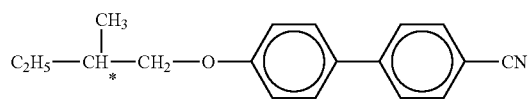
C15
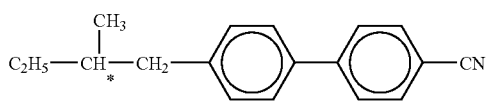
CB15
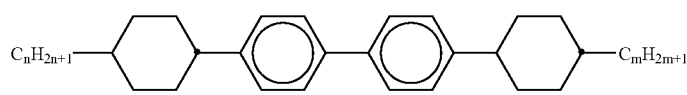
CBC-nm
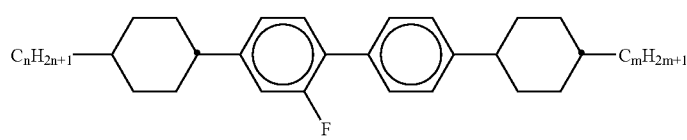
CBC-nmF
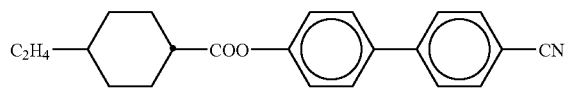
CHE TABLE B-continued
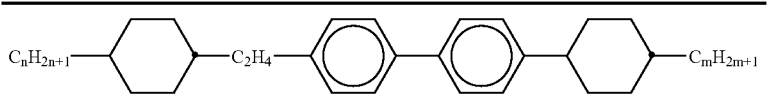
ECBC-nm
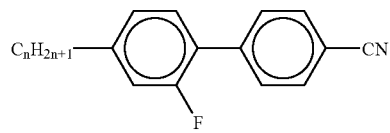
GP-nO-N
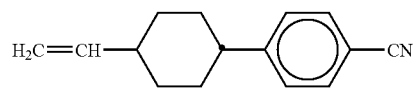
CP-V-N
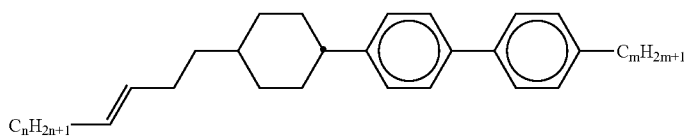
CCP-nV2-m
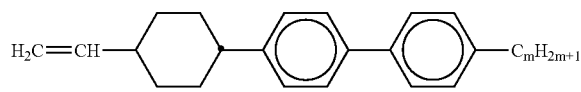
CPP-V-m
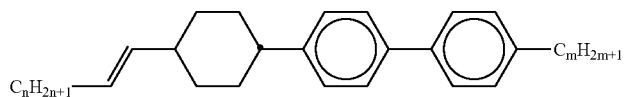
CPP-nV-m
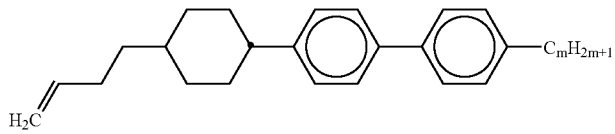
CPP-V2-m
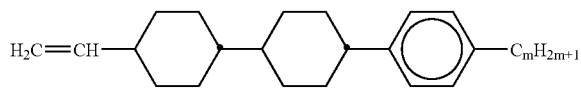
CCP-V-m
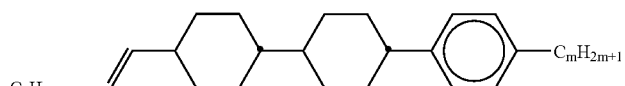
CCP-nV-m
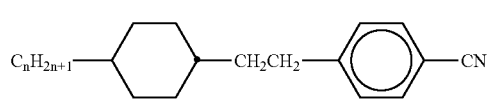
G3.n TABLE B-continued
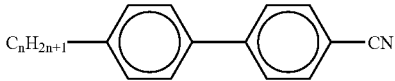
K3.n
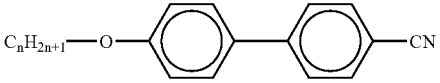
M3.n
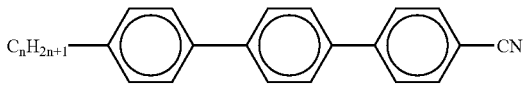
T3.n
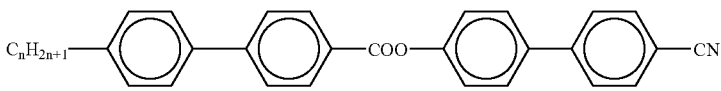
BB3.n
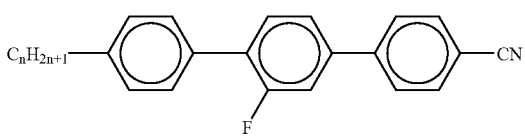
PGIP-n-N
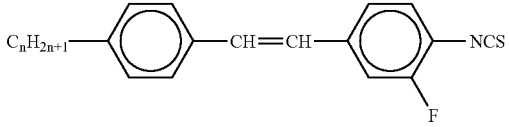
PVG-n-S
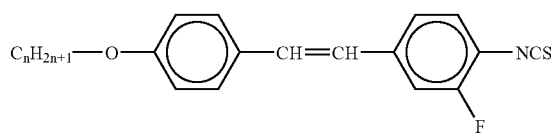
PVG-nO-S
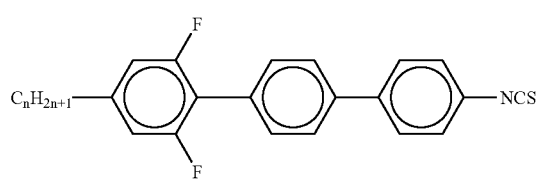
UPP-n-S
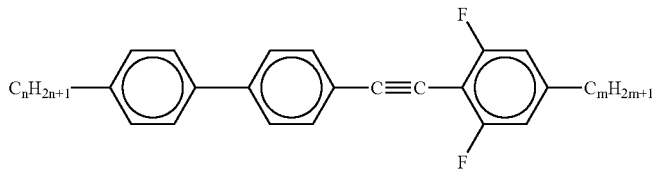
PPTUI-n-m TABLE B-continued
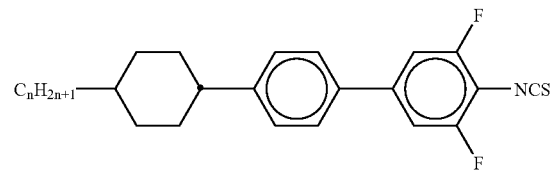
CPU-n-S
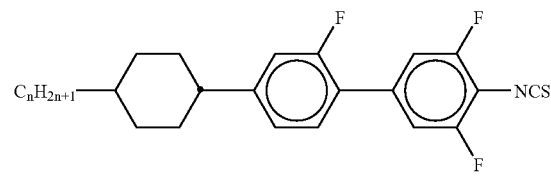
CGU-n-S
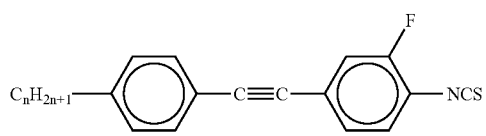
PTG-n-S
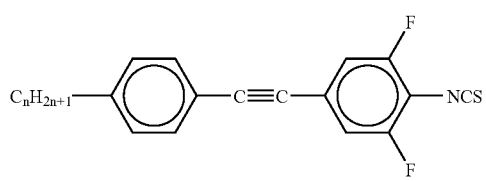
PTU-n-S
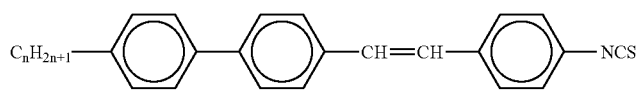
PPVP-n-S
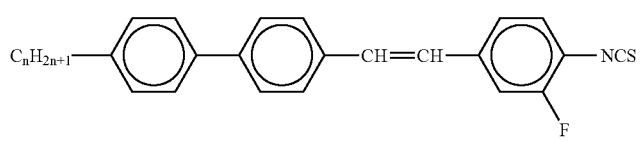
PPVG-n-S
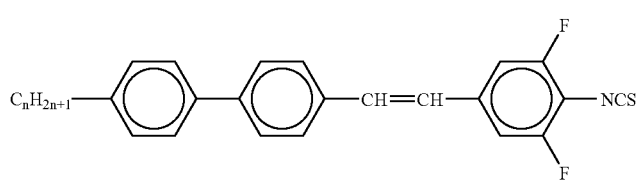
PPVU-n-S
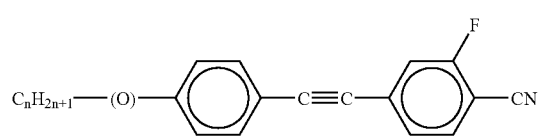
PTG-n(O)-N TABLE B-continued
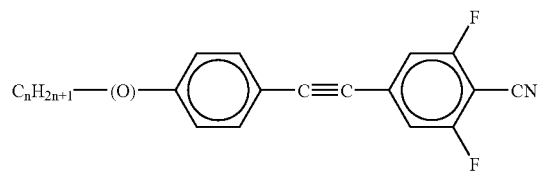
PTU-n(O)-N
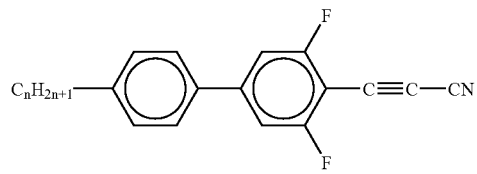
PU-n-AN
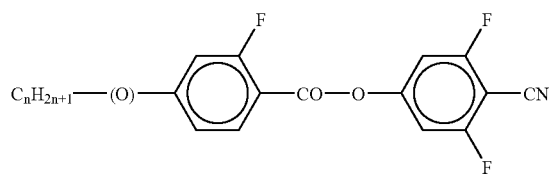
GZU-n(O)-N
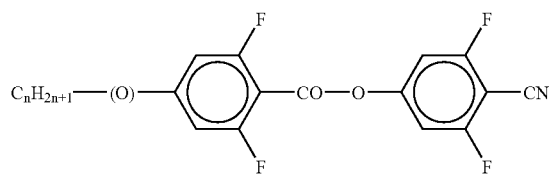
UZU-n(O)-N
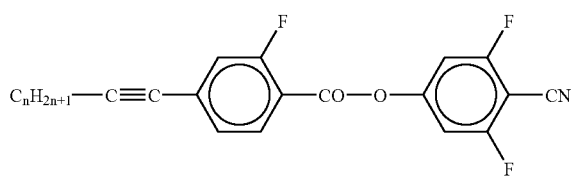
GZU-nA-N
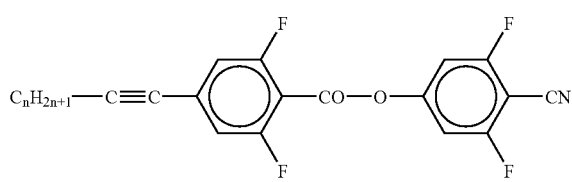
UZU-nA-N
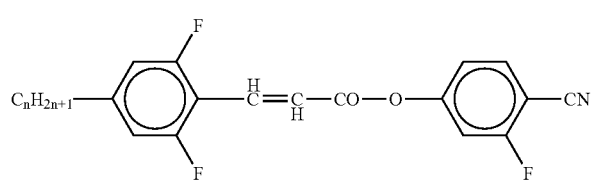
UVZG-n-N TABLE B-continued
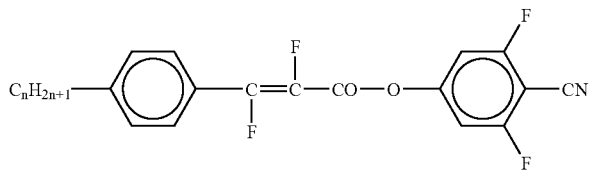
PWZU-3-N
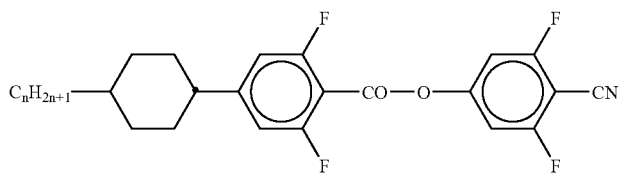
CUZU-n-N
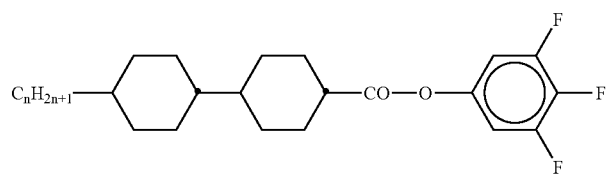
CCZU-n-F
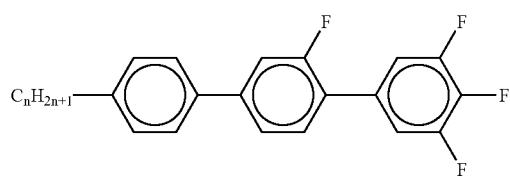
PGU-n-F
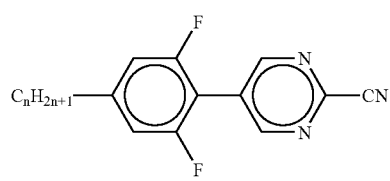
UM-n-N
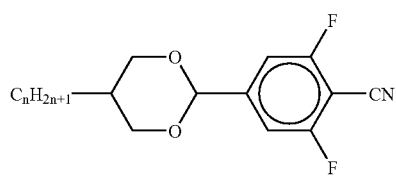
DU-n-N
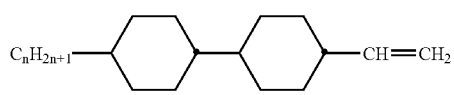
CC-n-V
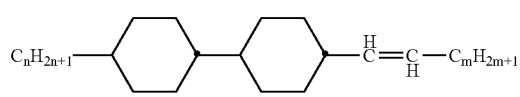
CC-n-Vm The mesogenic media in accordance with the present application preferably comprise

- four or more, preferably six or more, compounds selected from the group consisting of the compounds of Tables A and B and/or
- five or more compounds selected from the group consisting of the compounds of Table B and/or
- two or more compounds selected from the group consisting of the compounds of Table A.

EXAMPLES

The examples described below illustrate the present invention without restricting it in any way. They furthermore indicate to the person skilled in the art the properties and in particular the property combinations that can be achieved by means of the present invention.

Example 1

A liquid-crystal mixture of the following composition was prepared.

| Compound/abbreviation | Concentration/% by weight |
|---|---|
| ME2N.F | 3.0 |
| ME3N.F | 3.0 |
| ME4N.F | 8.0 |
| ME5N.F | 8.0 |
| UM-3-N | 4.0 |
| PTG-3-N | 8.0 |
| PTG-5-N | 8.0 |
| PTU-4O-N | 8.0 |
| PU-3-AN | 8.0 |
| PU-5-AN | 8.0 |
| PGU-2-F | 10.0 |
| PGU-3-F | 10.0 |
| PGU-5-F | 10.0 |
| HP-3N.F | 4.0 |
| Σ | 100.0 |

This mixture had the following properties:

| | |
|---|---|
| Clearing point (T(N, I))/° C.: | 23.8 |
| $n_e$ (20° C., 589.3 nm): | 1.6971 |
| Δn (20° C., 589.3 nm): | 0.1456 |
| $\epsilon_\parallel$ (20° C., 1 kHz): | 47.4 |
| Δε (20° C., 1 kHz): | 27.3 |

An electro-optical test cell containing a light modulation element containing the liquid-crystal mixture was produced. The substrates consisted of glass. Substrates without an alignment layer were used. The electrode structure consisted of electrodes intermeshing in a comb-like manner. The width of the electrodes was 20 μm and the separation of the electrodes from one another was 10 μm. The layer thickness of the electrodes was 60 nm. The electrodes were all located in a common plane. The layer thickness of the modulation medium was 6.8 μm.

A first polariser was used before the cell and a second polariser (analyser) was used after the cell. The absorption axes of the two polarisers formed an angle of 90° to one another. The angle between the axis of maximum absorption of the polarisers and the component of the electric field in the plane of the display was in each case 45°. The voltage-transmission characteristic line was determined using a DMS 703 electro-optical measurement station from Autronic-Melchers, Karlsruhe, Germany. The operating temperature was 24.0° C. On perpendicular observation, a curve was obtained as is typical of a cell having electrically controlled birefringence (for example ECB). The value for the threshold voltage ($V_{10}$) was 41 V, the value for the mid-grey voltage ($V_{50}$) was 68 V and the value for the saturation voltage ($V_{90}$) was 80 V.

Example 2

A liquid-crystal mixture of the following composition was prepared.

| Compound/abbreviation | Concentration/% by weight |
|---|---|
| UM-3-N | 10.0 |
| PYP-3N.F.F | 15.0 |
| HP-3N.F | 10.0 |
| CUZU-2-N | 10.0 |
| CUZU-3-N | 10.0 |
| UVZG-3-N | 10.0 |
| GZU-4O-N | 10.0 |
| GZU-4-N | 1.0 |
| GZU-3A-N | 12.0 |
| UZU-3A-N | 12.0 |
| Σ | 100.0 |

This mixture had the following properties.

| | |
|---|---|
| Clearing point (T(N, I))/° C.: | 24.8 |
| $n_e$ (21° C., 589.3 nm): | 1.6372 |
| Δn (21° C., 589.3 nm): | 0.1122 |

Figure 1:
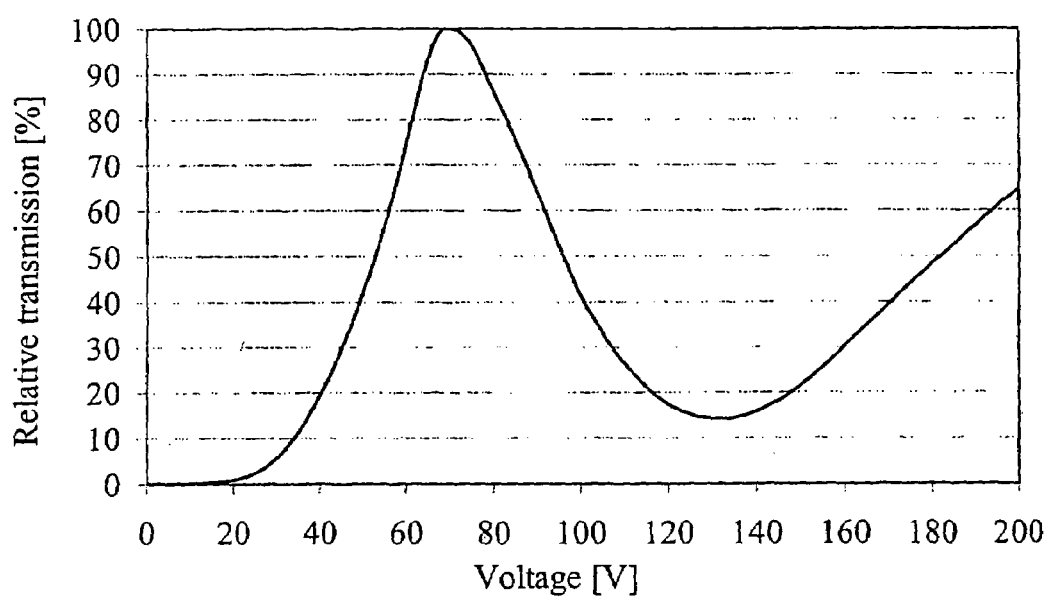
FIG. 1: The figure shows the transmission-voltage characteristic line of the light modulation element of Example 2. Relative intensities are shown as a function of the rms voltage values in volts.

As in Example 1, an electro-optical display was produced and its characteristic line measured. The temperature was 26.5° C. The characteristic line is shown in FIG. 1. The characteristic line starts at low voltage with a relative intensity of 0% and rises with increasing voltage. The value for the threshold voltage ($V_{10}$) was 34 V, the value for the mid-grey voltage ($V_{50}$) was 53 V and the value for the saturation voltage ($V_{90}$) was 64 V. At a voltage of 69 V, the maximum intensity is reached. Thereafter, the relative intensity drops to a value of about 14% at a voltage of 130 V. The relative intensity then rises again. At a voltage of 200 V, a relative intensity of 65% is achieved again.

The response times of the cells were likewise measured using the DMS 703. To this end, the high-frequency filter used as standard was switched off owing to the small values of the response times. In the case of switching between different grey shades, both the response time for switching off and that for switching on were less than 50 μs. To this end, the cell was in each case switched from voltage $V_{10}$ to each of $V_{90}$, $V_{80}$, $V_{50}$ and $V_{20}$, from $V_{20}$ to $V_{90}$ and $V_{80}$, from $V_{50}$ to $V_{90}$ and $V_{80}$, and from $V_{80}$ to $V_{90}$. The switch-on time from the time of switching on of the new voltage until 90% of the respective maximum change in transmission is achieved was 50 μs, within measurement accuracy (of 10 μs), for all these switching operations, i.e. both for switching off and for switching on, at all the addressing voltages used.

Example 3

A liquid-crystal mixture of the following composition was prepared.

| Compound/abbreviation | Concentration/% by weight |
|---|---|
| UM-3-N | 10.0 |
| GZU-3A-N | 10.0 |
| UVZG-3-N | 10.0 |
| PWZU-3-N | 7.0 |
| PU-3-AN | 16.0 |
| PU-5-AN | 16.0 |
| PTG-3-N | 15.0 |
| PTU-4O-N | 15.0 |
| HP-3N.F | 1.0 |
| Σ | 100.0 |

This mixture had the following properties.

| | |
|---|---|
| Clearing point (T(N, I))/° C.: | 22.9 |
| $n_e$ (19° C., 589.3 nm): | 1.7298 |
| Δn (19° C., 589.3 nm): | 0.1765 |

As in Example 1, an electro-optical display was produced and its characteristic line measured. The temperature was 23.1° C. Compared with the results from Example 2, the characteristic line in this example is shifted towards significantly lower voltages. The value for the threshold voltage ($V_{10}$) was 36.5 V, the value for the mid-grey voltage ($V_{50}$) was 55 V and the value for the saturation voltage ($V_{90}$) was 61.5 V. The maximum was at 65 V and the minimum at 83 V and at a relative intensity of about 32%. At a voltage of 126 V, the curve passes through a further, relatively flat maximum with a relative intensity of 88%, and at a voltage of 200 V, the relative intensity is 52%.

Example 4

A liquid-crystal mixture of the following composition was prepared.

| Compound/abbreviation | Concentration/% by weight |
|---|---|
| UZU-3A-N | 12.0 |
| UZU-5A-N | 12.0 |
| GZU-3A-N | 12.0 |
| GZU-5A-N | 11.0 |
| GZU-3O-N | 10.0 |
| UVZG-3-N | 10.0 |
| CUZU-2-N | 10.0 |
| CUZU-3-N | 10.0 |
| CUZU-4-N | 10.0 |
| HP-5N.F | 3.0 |
| Σ | 100.0 |

This mixture had the following properties.

| | |
|---|---|
| Clearing point (T(N, I))/° C.: | 23.7 |
| $n_e$ (20° C., 589.3 nm): | 1.6187 |
| Δn (20° C., 589.3 nm): | 0.0925 |

As in Example 1, an electro-optical display was produced and its characteristic line measured. The temperature was 23.5° C. The rising part of the characteristic line at low voltages for this example is at voltages between those of Examples 2 and 3. The value for the threshold voltage ($V_{10}$) was 41 V, the value for the mid-grey voltage ($V_{50}$) was 55.5 V and the value for the saturation voltage ($V_{90}$) was 65 V. The maximum was at 72 V and the minimum at 123 V and a relative intensity of 19%. At a voltage of 200 V, a relative intensity of about 74% was achieved.

Isocontrast curves for the display were recorded at a temperature of 23.7° C. using the DMS 703. The results are shown in FIG. 2 in polar coordinates. The voltage was switched from 0 V to 91 V. The contrast ratios were determined via the hemisphere with Φ (phi) of from 0° to 360° and Θ (theta) of from 0° to 60°. The maximum contrast ratio of 36.8 occurred on perpendicular observation. The minimum contrast ratio was 6.1. The isocontrast curves in the figures show, from the inside outward, the lines for contrast ratios of 20, 15, 10 and 7. The curve shape is virtually centrosymmetrical and is very similar to that obtained for IPS cells.

Comparative Example

A conventional TN display cell was produced. The liquid-crystal material used was MLC-6873-100 from Merck KGaA. The optical retardation was 0.50 μm. Isocontrast curves were measured as described in Example 4. During this measurement, the TN cell was switched from a voltage of 0 V to 2.36 V, double the value of the threshold voltage. The results are shown in FIG. 3. As for the display element in Example 4, the maximum contrast again occurred here on perpendicular observation. However, the maximum contrast ratio was only 29.9. The minimum contrast ratio was only 1.0. An inverse contrast did not occur in the TN cell either under these addressing conditions. Just this shows the lower overall contrast compared with FIG. 2 for Example 4, and the significantly greater viewing-angle dependence of the contrast. The isocontrast curves in the figures show, from the inside outward, the lines for contrast ratios of 20, 15, 10, 7, 5, 3 and 2. The curves here do not have a centrosymmetrical shape. In addition, they are much closer together than in FIG. 2 for Example 4, i.e. the viewing-angle dependence of the contrast in this comparative example is significantly greater here than in Example 4.

Further examples of mesogenic modulation media according to the invention are shown below.

Example 5

A liquid-crystal mixture of the following composition was prepared.

| Compound/abbreviation | Concentration/% by weight |
|---|---|
| CGU-2-F | 11.0 |
| CGU-3-F | 11.0 |
| CGU-5-F | 10.0 |
| BCH-3F.F.F | 18.0 |
| BCH-5F.F.F | 14.0 |
| PGU-2-F | 11.0 |
| PGU-3-F | 11.0 |
| PGU-5-F | 11.0 |
| BCH-32 | 3.0 |
| Σ | 100.0 |

This mixture had the following properties.

| | |
|---|---|
| Clearing point (T(N, I))/° C.: | 23.5 |
| $n_e$ (20° C., 589.3 nm): | 1.6138 |
| Δn (20° C., 589.3 nm): | 0.0854 |
| ε∥ (20° C., 1 kHz): | 16.5 |
| Δε (20° C., 1 kHz): | 9.1 |

Example 6

A liquid-crystal mixture of the following composition was prepared.

| Compound/abbreviation | Concentration/% by weight |
|---|---|
| ME2N.F | 10.0 |
| UM-3-N | 8.5 |
| PTG-5-N | 15.0 |
| PTG-3-N | 15.0 |
| PU-3-AN | 15.0 |
| PU-5-AN | 15.0 |
| PTU-4O-N | 15.0 |
| HP-3N.F | 6.5 |
| Σ | 100.0 |

This mixture had the following properties.

| | |
|---|---|
| Clearing point (T(N, I))/° C.: | 29.6 |
| $n_e$ (20° C., 589.3 nm): | 1.7549 |
| Δn (20° C., 589.3 nm): | 0.2092 |
| ε∥ (20° C., 1 kHz): | 59.2 |
| Δε (20° C., 1 kHz): | 42.9 |

Example 7

A liquid-crystal mixture of the following composition was prepared.

| Compound/abbreviation | Concentration/% by weight |
|---|---|
| UM-3-N | 8.0 |
| GZU-3A-N | 8.0 |
| UVZG-3-N | 8.0 |
| PWZU-3-N | 10.0 |
| PYP-4ON.F.F | 6.0 |
| PU-3-AN | 15.0 |
| PU-5-AN | 15.0 |
| PTG-3-N | 15.0 |
| PTU-4O-N | 15.0 |
| Σ | 100.0 |

Example 8

A liquid-crystal mixture of the following composition was prepared.

| Compound/abbreviation | Concentration/% by weight |
|---|---|
| PTG-3-N | 15.0 |
| PTG-5-N | 15.0 |
| PTU-4O-N | 15.0 |
| PU-5-AN | 9.0 |
| PGU-5-F | 14.0 |
| HP-3N.F | 7.0 |
| HP-5N.F | 8.0 |
| DU-2-N | 15.0 |
| PCH-3N.F.F | 2.0 |
| Σ | 100.0 |

This mixture had the following properties.

| | |
|---|---|
| Clearing point (T(N, I))/° C.: | 24.2 |
| $n_e$ (20° C., 589.3 nm): | 1.6857 |
| Δn (20° C., 589.3 nm): | 0.1405 |
| ε∥ (20° C., 1 kHz): | 45.8 |
| Δε (20° C., 1 kHz): | 27.8 |

Example 9

A liquid-crystal mixture of the following composition was prepared.

| Compound/abbreviation | Concentration/% by weight |
|---|---|
| CCP-2F.F.F | 10.0 |
| CCP-3F.F.F | 10.0 |
| CCP-5F.F.F | 10.0 |
| ME2N.F | 10.0 |
| ME3N.F | 10.0 |
| ME4N.F | 7.0 |
| ME5N.F | 15.0 |
| DU-2-N | 6.0 |
| PCH-5N.F.F | 2.0 |
| UM-3-N | 10.0 |
| HP-3N.F | 10.0 |
| Σ | 100.0 |

This mixture had the following properties.

| | |
|---|---|
| Clearing point (T(N, I))/° C.: | 30.1 |
| $n_e$ (20° C., 589.3 nm): | 1.6095 |
| Δn (20° C., 589.3 nm): | 0.1035 |
| ε∥ (20° C., 1 kHz): | 62.6 |
| Δε (20° C., 1 kHz): | 45.9 |

Example 10

A liquid-crystal mixture of the following composition was prepared.

| Compound/abbreviation | Concentration/% by weight |
|---|---|
| UM-3-N | 6.0 |
| GZU-3A-N | 10.0 |
| UVZG-3-N | 12.0 |
| PWZU-3-N | 10.0 |

-continued

| Compound/abbreviation | Concentration/% by weight |
|---|---|
| PU-3-AN | 15.0 |
| PU-5-AN | 15.0 |
| PTG-3-N | 15.0 |
| PTU-4O-N | 15.0 |
| HP-3N.F | 2.0 |
| Σ | 100.0 |

This mixture had the following properties.

Δ∈(20° C., 1 kHz)>0

Example 11

A liquid-crystal mixture of the following composition was prepared.

| Compound/abbreviation | Concentration/% by weight |
|---|---|
| CGU-2-F | 11.0 |
| CGU-3-F | 11.0 |
| CGU-5-F | 10.0 |
| BCH-3F.F.F | 16.0 |
| BCH-5F.F.F | 14.0 |
| PGU-2-F | 10.0 |
| PGU-3-F | 10.0 |
| PGU-5-F | 9.0 |
| PCH-7F | 9.0 |
| Σ | 100.0 |

This mixture had the following properties.

| Clearing point (T(N, I))/° C.: | 11.5 |
|---|---|
| Δε (20° C., 1 kHz) > 0 | |

Example 12

A liquid-crystal mixture of the following composition was prepared.

| Compound/abbreviation | Concentration/% by weight |
|---|---|
| CGU-2-F | 12.0 |
| CGU-3-F | 12.0 |
| CGU-5-F | 11.0 |
| BCH-3F.F.F | 18.0 |
| BCH-5F.F.F | 14.0 |
| PGU-2-F | 11.0 |
| PGU-3-F | 11.0 |
| PGU-5-F | 11.0 |
| Σ | 100.0 |

This mixture had the following properties.

| Clearing point (T(N, I))/° C.: | 15.5 |
|---|---|
| Δε (20° C., 1 kHz) > 0 | |

Example 13

A liquid-crystal mixture of the following composition was prepared.

| Compound/abbreviation | Concentration/% by weight |
|---|---|
| ME2N.F | 3.0 |
| ME3N.F | 3.0 |
| ME4N.F | 5.0 |
| ME5N.F | 3.0 |
| UM-3-N | 4.0 |
| PTG-3-N | 8.0 |
| PTG-5-N | 8.0 |
| PTU-4O-N | 7.0 |
| PU-3-AN | 8.0 |
| PU-5-AN | 8.0 |
| PGU-2-F | 10.0 |
| PGU-3-F | 10.0 |
| PGU-5-F | 10.0 |
| HP-3N.F | 4.0 |
| HP-4N.F | 5.0 |
| HP-5N.F | 4.0 |
| Σ | 100.0 |

This mixture had the following properties.

| Clearing point (T(N, I))/° C.: | 42.3 |
|---|---|
| Δε (20° C., 1 kHz) > 0 | |

Example 14

A liquid-crystal mixture of the following composition was prepared.

| Compound/abbreviation | Concentration/% by weight |
|---|---|
| ME2N.F | 3.0 |
| ME3N.F | 3.0 |
| ME4N.F | 8.0 |
| ME5N.F | 9.0 |
| UM-3-N | 4.0 |
| PTG-3-N | 9.0 |
| PTG-5-N | 8.0 |
| PTU-4O-N | 8.0 |
| PU-3-AN | 9.0 |
| PU-5-AN | 9.0 |
| PGU-2-F | 10.0 |
| PGU-3-F | 10.0 |
| PGU-5-F | 10.0 |
| Σ | 100.0 |

This mixture had the following properties.

| Clearing point (T(N, I))/° C.: | 16.0 |
|---|---|
| Δε (20° C., 1 kHz) > 0 | |

Example 15

A liquid-crystal mixture of the following composition was prepared.

| Compound/abbreviation | Concentration/% by weight |
|---|---|
| YY-2-O2 | 8.0 |
| YY-3-O2 | 8.0 |
| YY-4O-O4 | 10.0 |
| YY-V1O-O1V | 8.0 |
| PY-3-O2 | 15.0 |
| PY-1-O2 | 11.0 |
| CYY-3-O2 | 10.0 |
| CYY-5-O2 | 10.0 |
| PTP-302FF | 10.0 |
| PTP-502FF | 10.0 |
| Σ | 100.0 |

This mixture had the following properties.

$\Delta\epsilon$ (20° C., 1 kHz) < 0

Example 16

A liquid-crystal mixture of the following composition was prepared.

| Compound/abbreviation | Concentration/% by weight |
|---|---|
| YY-2-O2 | 8.0 |
| YY-3-O2 | 8.0 |
| YY-3O-O2 | 6.0 |
| YY-4O-O4 | 6.0 |
| YY-V1O-O1V | 6.0 |
| PY-3-O2 | 9.0 |
| PY-1-O2 | 12.0 |
| CYY-3-O2 | 9.0 |
| CYY-5-O2 | 9.0 |
| PTP-302FF | 10.0 |
| PTP-502FF | 10.0 |
| CPY-3-O2 | 5.0 |
| CCYY-2-O2 | 2.0 |
| Σ | 100.0 |

This mixture had the following properties.

$\Delta\epsilon$ (20° C., 1 kHz) < 0

Example 17

A liquid-crystal mixture of the following composition was prepared.

| Compound/abbreviation | Concentration/% by weight |
|---|---|
| PYP-5F | 25.0 |
| PCH-32 | 16.5 |
| PCH-301 | 15.0 |
| PCH-302 | 11.3 |
| BCH-32 | 14.3 |
| BCH-52 | 10.5 |
| CBC-33 | 3.7 |
| CBC-53 | 3.7 |
| Σ | 100.0 |

This mixture had the following properties.

| | |
|---|---|
| Clearing point (T(N, I))/° C.: | 41.0 |
| $n_e$ (20° C., 589.3 nm): | 1.6157 |
| $\Delta n$ (20° C., 589.3 nm): | 0.1066 |
| $\epsilon_\parallel$ (20° C., 1 kHz): | 5.7 |
| $\Delta\epsilon$ (20° C., 1 kHz): | 2.4 |

Example 18

A liquid-crystal mixture of the following composition was prepared.

| Compound/abbreviation | Concentration/% by weight |
|---|---|
| PCH-5F | 14.6 |
| PCH-6F | 12.9 |
| PCH-7F | 12.5 |
| PTP-20F | 15.2 |
| PTP-40F | 19.1 |
| PTP-60F | 25.7 |
| Σ | 100.0 |

This mixture had the following properties.

| | |
|---|---|
| Clearing point (T(N, I))/° C.: | 27.0 |
| $n_e$ (20° C., 589.3 nm): | 1.6470 |
| $\Delta n$ (20° C., 589.3 nm): | 0.1350 |
| $\epsilon_\parallel$ (20° C., 1 kHz): | 7.4 |
| $\Delta\epsilon$ (20° C., 1 kHz): | 3.6 |
| $k_1$ (20° C.)/pN: | 5.7 |
| $k_2$ (20° C.)/pN: | 3.1 |
| $k_3$ (20° C.)/pN: | 6.3 |

Example 19

A liquid-crystal mixture of the following composition was prepared.

| Compound/abbreviation | Concentration/% by weight |
|---|---|
| CCP-2F.F.F | 4.0 |
| CCP-2OCF3 | 4.0 |
| CCP-3OCF3 | 5.0 |
| CCP-4OCF3 | 2.0 |
| PCH-3 | 6.0 |
| K9 | 4.0 |
| BCH-3F.F.F | 12.0 |
| CGU-2-F | 10.0 |
| CGU-3-F | 6.0 |
| CCZU-2-F | 5.0 |
| CCZU-3-F | 16.0 |
| CCZU-5-F | 5.0 |
| CC-5-V | 2.0 |
| CCP-V-1 | 10.0 |
| CC-3-V1 | 9.0 |
| Σ | 100.0 |

This mixture had the following properties.

| | |
|---|---|
| Clearing point (T(N, I))/° C.: | 30.0 |
| $n_e$ (20° C., 589.3 nm): | 1.5856 |
| $\Delta n$ (20° C., 589.3 nm): | 0.1007 |

-continued

| | |
|---|---|
| ε∥ (20° C., 1 kHz): | 14.5 |
| Δε (20° C., 1 kHz): | 10.6 |

Example 20

A liquid-crystal mixture of the following composition was prepared.

| Compound/abbreviation | Concentration/% by weight |
|---|---|
| PCH-5 | 19.0 |
| PCH-302 | 31.0 |
| PCH-304 | 31.0 |
| K15 | 19.0 |
| Σ | 100.0 |

This mixture had the following properties.

| | |
|---|---|
| Clearing point (T(N, I))/° C.: | 33.0 |
| $n_e$ (20° C., 589.3 nm): | 1.6010 |
| Δn (20° C., 589.3 nm): | 0.1100 |
| ε∥ (20° C., 1 kHz): | 9.5 |
| Δε (20° C., 1 kHz): | 4.9 |

Example 21

A liquid-crystal mixture of the following composition was prepared.

| Compound/abbreviation | Concentration/% by weight |
|---|---|
| PCH-302FF | 26.0 |
| PCH-502FF | 26.0 |
| CCP-V-1 | 15.0 |
| CC-5-V | 19.0 |
| CCH-35 | 8.0 |
| BCH-32 | 6.0 |
| Σ | 100.0 |

This mixture had the following properties.

| | |
|---|---|
| Clearing point (T(N, I))/° C.: | 50.0 |
| Δε (20° C., 1 kHz) < 0 | |

Example 22

A liquid-crystal mixture of the following composition was prepared.

| Compound/abbreviation | Concentration/% by weight |
|---|---|
| PCH-302FF | 26.0 |
| PCH-502FF | 26.0 |

-continued

| Compound/abbreviation | Concentration/% by weight |
|---|---|
| CCP-V-1 | 13.0 |
| CC-5-V | 16.0 |
| CCH-35 | 5.0 |
| BCH-32 | 9.0 |
| CCP-21FF | 3.0 |
| PCH-301 | 2.0 |
| Σ | 100.0 |

This mixture had the following properties.

| | |
|---|---|
| Clearing point (T(N,I))/° C.: | 50.0 |
| $n_e$ (20° C., 589.3 nm): | 1.5640 |
| Δn (20° C., 589.3 nm): | 0.0821 |
| ε∥ (20° C., 1 kHz): | 3.9 |
| Δε (20° C., 1 kHz): | −2.9 |
| $γ_1$ (20° C.)/mPa · s: | 72 |

The invention claimed is:

1. An electro-optical display, containing one or more light modulation elements comprising
    an electrode arrangement,
    at least one element for polarisation of the light, and
    a mesogenic modulation medium having a value of Δε of 15 or more, at a temperature of 4° C. below clearing point of the medium,
wherein the light during passage through the light modulation element in each case passes through at least one element for polarization of the light before passing through the mesogenic modulation medium and after passing through the mesogenic modulation medium and wherein the light modulation element
    is operated at a temperature at which the mesogenic modulation medium in the unaddressed state is in the isotropic phase, and
the display is addressed by an active matrix.

2. The display according to claim 1, wherein
the electrode arrangement is able to generate an electric field having a significant component parallel to the surface of the mesogenic modulation medium.

3. The display according to claim 1 wherein
the mesogenic modulation medium has a nematic phase.

4. The display according to claim 1, wherein
the electrode arrangement during operation of the light modulation element generates an electric field having a significant component parallel to the plane of the mesogenic modulation medium.

5. The display according to claim 1, wherein
the electrode arrangement is located on one side of the layer of the mesogenic modulation medium.

6. The display according to claim 1, containing a birefringent layer.

7. An electro-optical display system containing one or more electro-optical displays according to claim 1.

8. Electro-optical display system according to claim 7, which is a television monitor and/or a computer monitor.

9. A display according to claim 1 which displays information.

10. An electro-optical display system according to claim 7 which displays video signals.

11. An electro-optical display, containing one or more light modulation elements comprising an electrode arrangement, at least one element for polarisation of the light, and a mesogenic modulation medium having a value of Δε of 15 or more, at a temperature of 4° C. below clearing point of the medium, wherein the light modulation element is operated at a temperature at which the mesogenic modulation medium in the unaddressed state is in the isotropic phase, and the display is addressed by an active matrix and wherein the mesogenic modulation medium comprises at least one compound of formula I

in which

R$^1$ is n-alkyl or n-alkoxy, each having from 1 to 7 carbon atoms, or alkenyl, alkenyloxy, alkynyl or alkoxyalkyl, each having from 2 to 7 carbon atoms,

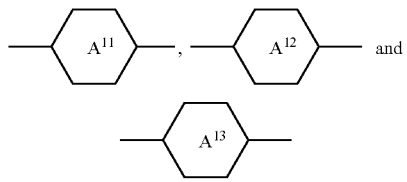

are each, independently of one another,

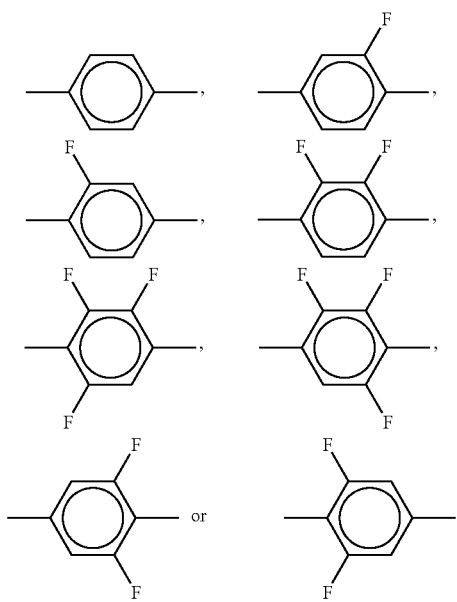

and one of

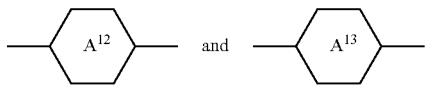

is alternatively

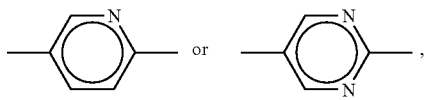

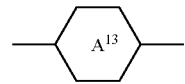

is alternatively

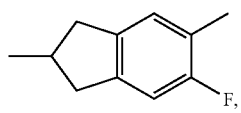

is alternatively

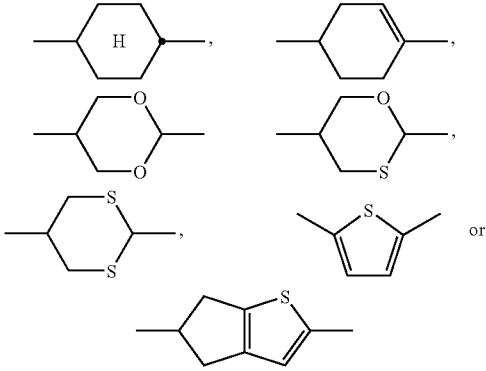

and, if present,

is alternatively

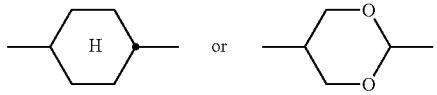

$Z^{11}$ and $Z^{12}$ are each, independently of one another, a single bond, —CO—O—, trans —CH=CH—, —CH=CF—, —CF=CH—, —CF=CF—, —CH=CH—CO—O—, —CF=CF—CO—O—, —CF=CH—CO—O—, —CH=CF—CO—O—, —CF$_2$—O—, —O—CF$_2$— or —C≡C—, $X^1$ is F, —OCF$_3$, —CF$_3$, —OCF$_2$H, Cl, CN, —C≡C—CN or NCS, and $n^1$ is 0 or 1, where in the case where $X^1$=F,
the phenyl rings carry a total of at least 2, further F atoms, in the case where $X^1$=—OCF$_3$, —CF$_3$, —OCF$_2$H or Cl,
the phenyl rings carry a total of at least 1 further F atom.

12. The display according to claim 1, wherein the mesogenic modulation medium has a layer thickness (d) of 0.5 µm to 1000 µm.

13. The display according to claim 1, wherein the mesogenic modulation medium has a layer thickness (d) of 1.0 µm to 100 µm.

14. The display according to claim 11, wherein the mesogenic modulation medium $X^1$ is —CN, —C≡C—CN or —NCS.

15. The display according to claim 11, wherein the mesogenic modulation medium $X^1$ is F and the phenyl rings carry at least 3 further F atoms.

16. The display according to claim 11, wherein the mesogenic modulation medium $X^1$ is OCF$_3$, —CF$_3$, —OCF$_2$ or CL, and the phenyl rings carry at least 2 further F atoms.

17. The display according to claim 11, wherein the mesogenic modulation medium $X^1$ is —CN, —C≡C—CN or —NCS, and the phenyl rings carry at least 1 further F atom.

18. The display according to claim 11, wherein the mesogenic modulation medium $n^1$ is 1 and

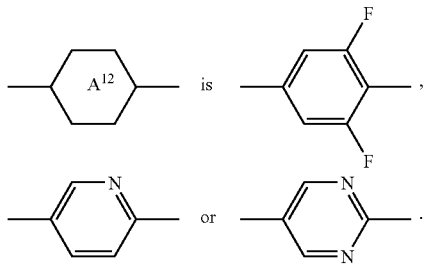

19. The display according to claim 1, wherein the mesogenic modulation medium has a Δε at 4° C. below clearing point of 30 or more.

20. The display according to claim 11, wherein
the electrode arrangement is able to generate an electric field having a significant component parallel to the surface of the mesogenic modulation medium.

21. The display according to claim 11 wherein
the mesogenic modulation medium has a nematic phase.

22. The display according to claim 11, wherein
the electrode arrangement during operation of the light modulation element generates an electric field having a significant component parallel to the plane of the mesogenic modulation medium.

23. The display according to claim 11, wherein
the electrode arrangement is located on one side of the layer of the mesogenic modulation medium.

24. The display according to claim 11 containing a birefringent layer.

25. An electro-optical display system containing one or more electro-optical displays according to claim 11.

26. Electro-optical display system according to claim 11, which is a television monitor and/or a computer monitor.

27. A display according to claim 11 which displays information.

28. An electro-optical display system according to claim 11 which displays video signals.

29. The display according to claim 11, wherein the mesogenic modulation medium has a layer thickness (d) of 0.5 µm to 1000 µm.

30. The display according to claim 11, wherein the mesogenic modulation medium has a layer thickness (d) of 1.0 µm to 100 µm.

* * * * *